(12) United States Patent
Nishihara et al.

(10) Patent No.: US 7,116,477 B2
(45) Date of Patent: Oct. 3, 2006

(54) STEREOSCOPIC IMAGE DISPLAY APPARATUS AND STEREOSCOPIC IMAGE DISPLAY SYSTEM

(75) Inventors: Hiroshi Nishihara, Tokyo (JP); Toshiyuki Sudo, Tochigi (JP); Hideki Morishima, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/404,523

(22) Filed: Apr. 1, 2003

(65) Prior Publication Data

US 2005/0078370 A1 Apr. 14, 2005

(30) Foreign Application Priority Data

Apr. 5, 2002 (JP) ............... 2002-104404

(51) Int. Cl.
*G20B 27/22* (2006.01)
(52) U.S. Cl. ............ 359/462; 359/463; 359/464; 348/54; 348/59
(58) Field of Classification Search .......... 359/462, 359/463, 464; 348/51, 59, 60, 56, 54; 351/240
See application file for complete search history.

(56) References Cited

U.S. PATENT DOCUMENTS 4,829,365 A * 5/1989 Eichenlaub ............ 348/54
6,302,541 B1 * 10/2001 Grossmann ............ 351/240
6,377,295 B1 * 4/2002 Woodgate et al. ........ 348/59
6,940,646 B1 * 9/2005 Taniguchi et al. ....... 359/463
2002/0021492 A1 * 2/2002 Morishima et al. ...... 359/463
2003/0206343 A1 * 11/2003 Morishima et al. ...... 359/463
2003/0214459 A1 * 11/2003 Nishihara et al. ........ 345/6

FOREIGN PATENT DOCUMENTS

EP 1 248 473 A1 10/2002

* cited by examiner

*Primary Examiner*—Audrey Chang
(74) *Attorney, Agent, or Firm*—Morgan & Finnegan, LLP

(57) ABSTRACT

A stereoscopic image display apparatus in accordance with the present invention solves a problem with a conventional multi-view stereoscopic image display apparatus in that the resolution of each parallax image deteriorates as the number of provided parallax images increases. The inventive stereoscopic image display apparatus forms a plurality of images for right and left eyes in observation regions for the observer's right and left eyes to enable the observer to obtain a stereoscopic view. At the same time, a region where no images are formed is provided between the right eye and left eye observation regions, because no actual observation is carried out in the region. This makes it possible to reduce the total number of parallax images without changing the number of actually observed parallax images, thus achieving a higher resolution of each parallax image actually observed.

4 Claims, 38 Drawing Sheets

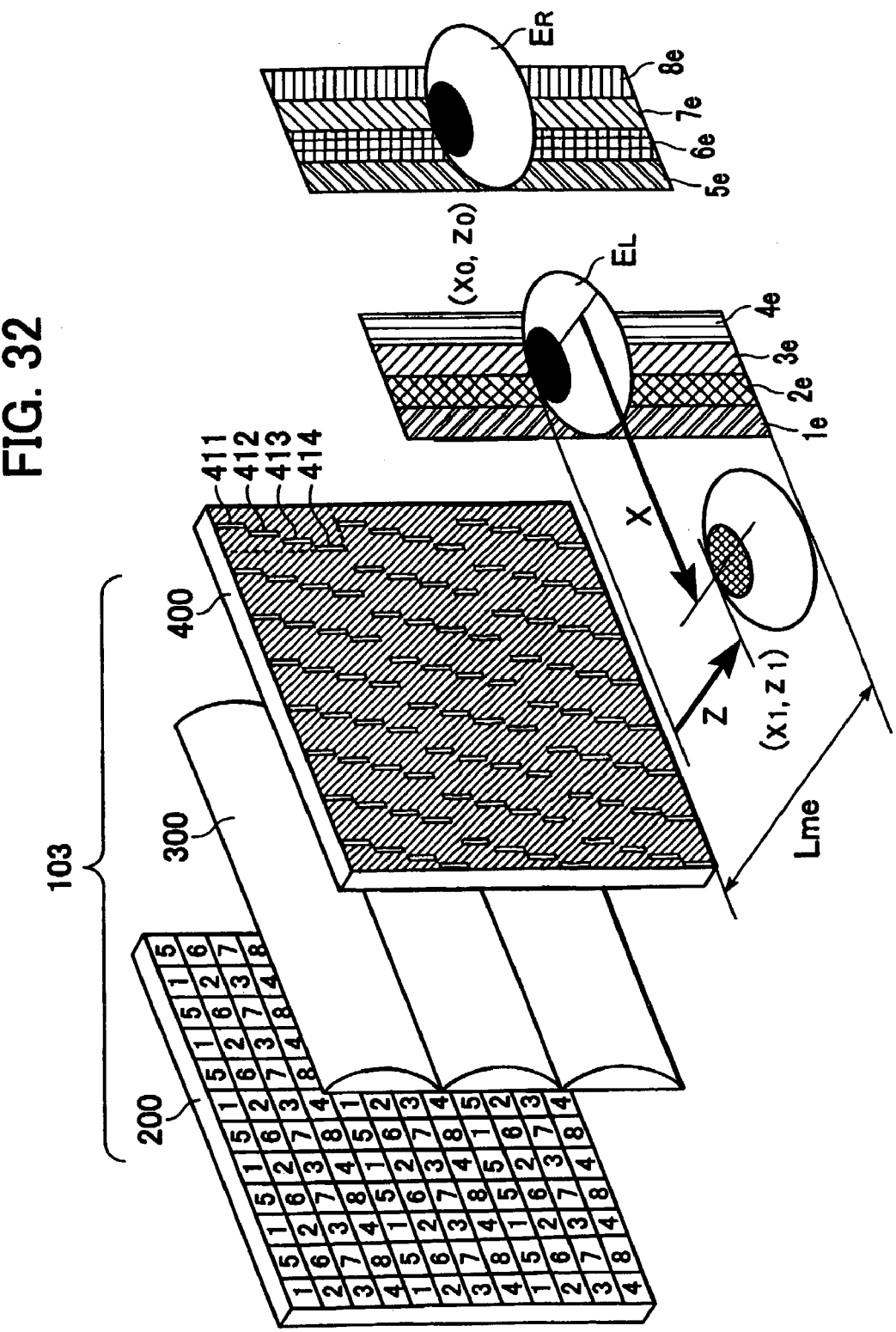

STEREOSCOPIC IMAGE DISPLAY APPARATUS AND STEREOSCOPIC IMAGE DISPLAY SYSTEM

BACKGROUND OF THE INVENTION

1. Field of the Invention

The present invention relates to a stereoscopic image display apparatus and, more particularly, to a stereoscopic image display apparatus ideally suited for performing stereoscopic display primarily in a television set, a video recorder, a computer monitor, a game machine, or the like.

2. Description of the Related Art

As a stereoscopic display apparatus, a "multi-view type" apparatus proposed in, for example, EP-1248473, is available. The stereoscopic image display apparatus is adapted to display numerous left eye and right eye images, i.e., parallax images, directed toward an extensive region. This means that, when an image is observed from a given position, numerous parallax images are formed also in an observable range that will not be simultaneously observed.

Forming numerous images in an extensive region advantageously provides a wider observation region and permits motion parallax representation.

However, the display resolution depends on the resolution, namely, the number of pixels, of a display unit used; therefore, displaying numerous parallax images inevitably deteriorates the resolutions of the individual parallax images. In addition, the need for preparing numerous parallax images involves an enormous capacity of an image data file, inconveniently resulting in more difficult handling in the applications for TV broadcast or the like.

SUMMARY OF THE INVENTION

It is an object of the present invention to provide a multi-view stereoscopic image display apparatus that permits the observation of parallax images from a relatively extensive range with a high resolution and minimizes the capacity of an image data file for obtaining parallax images so as to ensure easy handling.

To achieve the abovementioned object, a stereoscopic image display apparatus in accordance with the present invention includes an image display unit for displaying a plurality of pairs of images for left eye and images for right eye by using a different group of pixels for each image, and a masking member that has apertures through which light fluxes from a plurality of groups of pixels for displaying images for left eye and right eye, respectively directed to a right eye observation region (for allowing an observer to observe the image by his or her right eye) and a left eye observation region (for allowing the observer to view the image by his or her left eye), pass, and also has a light shielding portion for preventing the light from a plurality of groups of pixels from reaching a region between the two observation regions.

Thus, the light from the image display unit is intercepted so as not to reach the region which is located between the right eye observation region and the left eye observation region and in which practically no observation of an image is performed, thereby reducing the number of presented parallax images accordingly. This arrangement makes it possible to enhance the resolution of a parallax image observed from the observation region for left eye and the observation region for right eye, while securing a certain level of extension of the observation regions, and also to reduce the capacity of an image data file for obtaining parallax images.

Further objects, features and advantages of the present invention will become apparent from the following description of the preferred embodiments (with reference to the attached drawings).

BRIEF DESCRIPTION OF THE DRAWINGS

FIG. 32 is a perspective view showing the construction of a stereoscopic image display apparatus according to a fourth embodiment of the present invention.

DESCRIPTION OF THE PREFERRED EMBODIMENTS

First Embodiment

Figure 1:
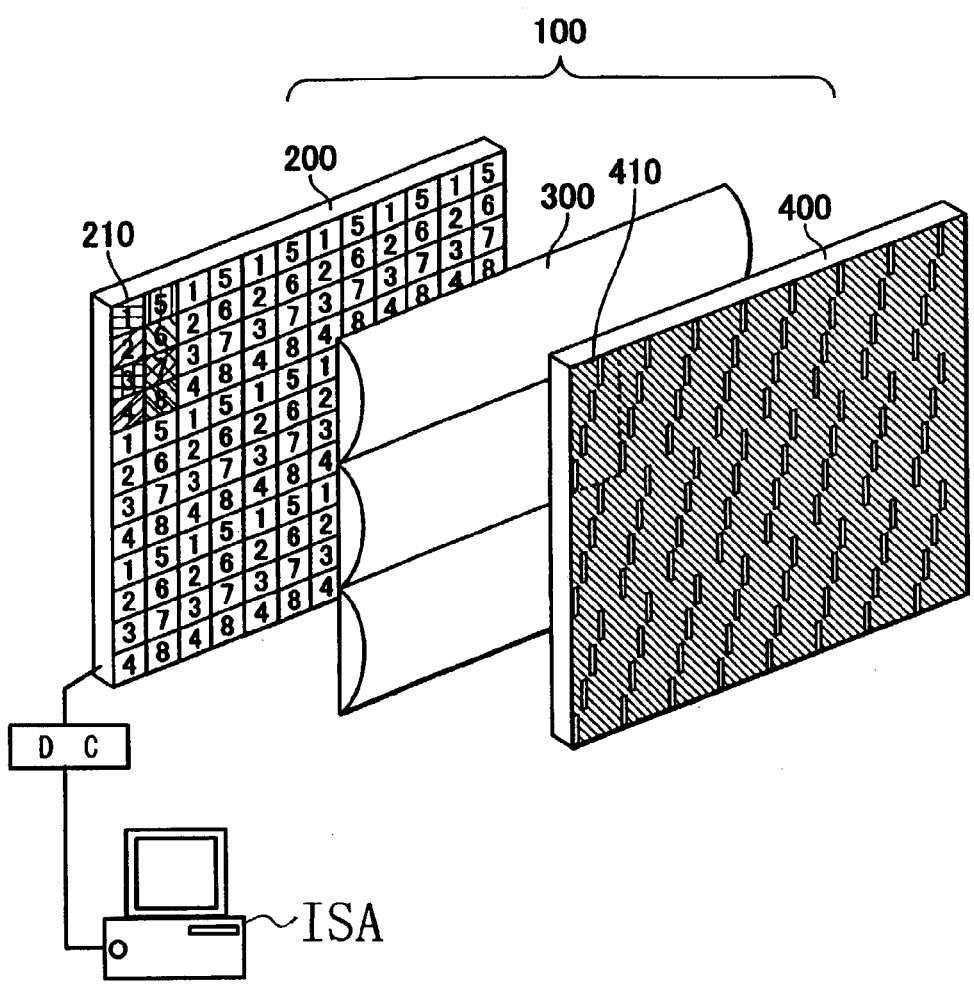
FIG. 1 is a perspective view showing the construction of a stereoscopic image display apparatus according to a first embodiment of the present invention.

FIG. 1 shows a schematic construction of a stereoscopic image display apparatus 100 according to a first embodiment of the present invention.

(General Construction of the Stereoscopic Image Display Apparatus 100)

Referring to FIG. 1, the stereoscopic image display apparatus 100 is constructed of a display unit (image display unit) 200, a lenticular lens assembly (optical member) 300, and a mask 400.

(Display Unit 200)

The display unit 200 is constructed of a display device having pixels arranged in vertical and horizontal arrays. Typical examples include an LCD display device, a plasma display device, an organic EL display device, and a projector. A driving circuit (DC) for driving the display unit 200 receives image information from an image information supplying apparatus, such as a personal computer, video equipment, or a DVD player (ISA). The driving circuit drives the pixels of the display unit 200 on the basis of the received image information to display an image.

A composite parallax image created by combining parallax images of the quantity that permits observation is displayed on the display unit 200. The descriptions will be given of the method for displaying a composite image when p (quantity) images for left eye and right eye, respectively, are formed in observation regions. Hereinafter, the horizontal direction will mean the direction in a plane that includes right eye and left eye, while the vertical direction will mean the direction perpendicular to the plane.

On the display unit 200, a pair of pixels is disposed in the horizontal direction for display, the pair of pixels displaying an image for left eye and an image for right eye, respectively. There are p pieces of images for each of right eye and left eye, respectively, forming p pairs of pixels, which are disposed in the vertical direction on the display unit 200. As a result, the individual pixels for displaying 2×p images are disposed in arrays of p lines and two columns in a predetermined sequence to form a pixel block 210. A plurality of the pixel blocks 210 is arranged in matrixes.

The hatched region on the display unit 200 shown in FIG. 1 indicates a single pixel block 210. This embodiment shows the arrays of the pixels obtained when the number of parallax images p=4 and the total number of images 2p=8.

Referring to FIG. 1, numerals 1 to 8 shown on the pixel block 210 denote the pixels for displaying the corresponding images among first to fourth right eye images observed by the right eye of an observer in a right eye observation region, and the pixels for displaying the corresponding images among fifth to eighth left eye images observed by the left eye.

One pixel block 210 is constructed by arranging eight pixels for displaying substantially the same parts of the first to eighth images or screens in a matrix pattern of 4 (p=4) lines and two columns. In a first column in the vertical direction, four pixels for displaying substantially the same parts of the first, second, third and fourth images are arranged in this order. In a second column in the vertical direction, the pixels for displaying substantially the same parts of fifth, sixth, seventh and eighth images are arranged in this order.

(Lenticular Lens Assembly 300)

A lenticular lens assembly 300 is constructed of a plurality of cylindrical lenses that have generatrices in the horizontal direction and are arranged in the vertical direction of a screen.

(Mask 400)

Figure 2:
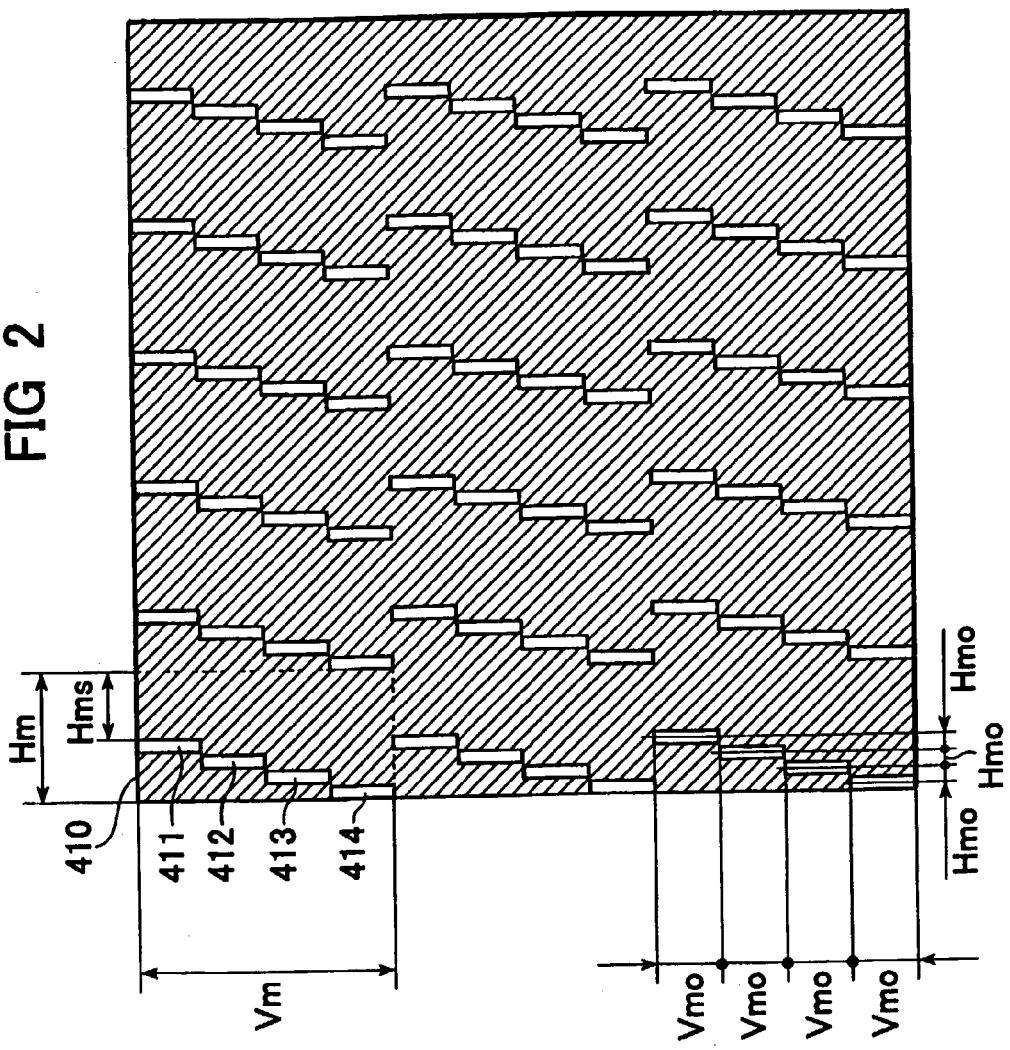
FIG. 2 is a front view of a mask constituting the stereoscopic image display apparatus.

FIG. 2 shows a specific construction of a mask 400. As shown in the figure, the mask 400 is constructed by a plurality of mask blocks 410 arranged in a matrix pattern, each mask block 410 has four (p=4) apertures 411, 412, 413 and 414. The height in the vertical direction of the mask block 410 is denoted by Vm, and the width in the horizontal direction is denoted by Hm.

The four apertures 411, 412, 413 and 414 in the mask block 410 are provided in association with the pairs of pixels for displaying the right eye images and the left eye images mentioned above. For this reason, the mask blocks 410 are substantially adjacently disposed in the vertical direction, while they are disposed at different positions in the horizontal direction. Furthermore, the mask block 410 is provided with a light shielding portion Hms in the vertical direction that is free of the four apertures 411, 412, 413 and 414. The light shielding portion Hms prevents light beams from a group of pixels of the display unit 200 from the region sandwiched between the right eye and left eye observation regions, as it will be discussed hereinafter.

(Operation of the Lenticular Lens Assembly 300)

Figure 3:
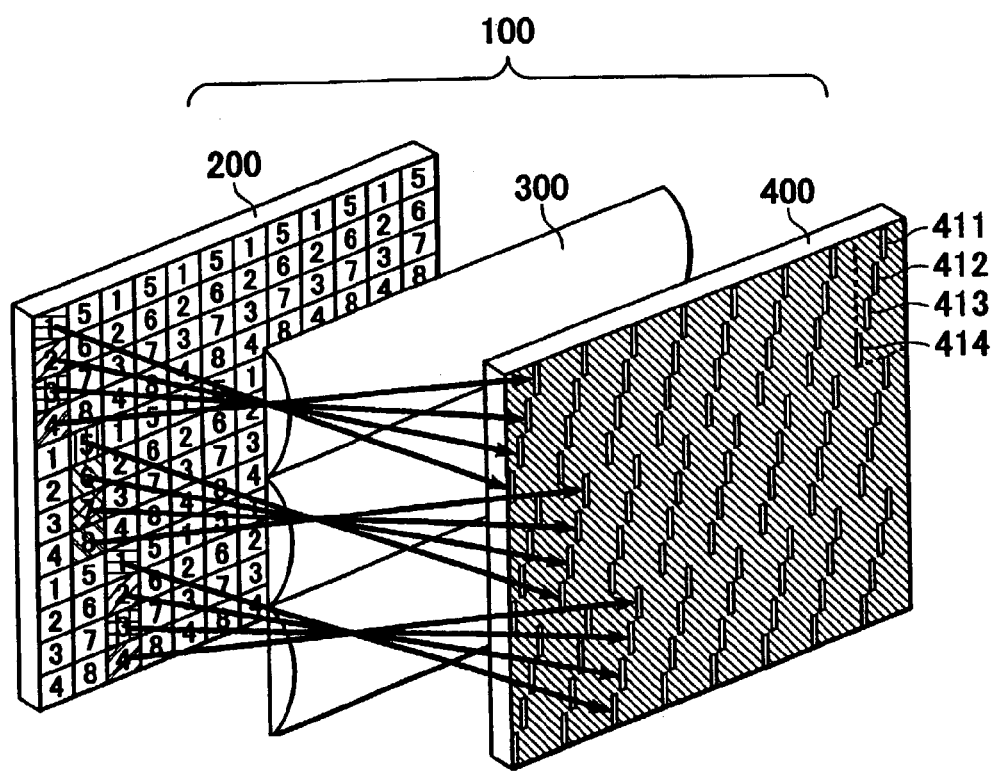
FIG. 3 is a perspective view showing the travel of light beams from a display in the stereoscopic image display apparatus.

Referring to FIG. 3, the light fluxes radially emitted from the pixels on the display unit 200 of the stereoscopic image display apparatus 100 are subjected to the lens action in the vertical direction by the respective cylindrical lenses of the lenticular lens assembly 300 in a particular vertical section.

FIGS. 4, 5, 6 and 7 illustrate the action of the lenticular lens assembly 300.

Figure 4:
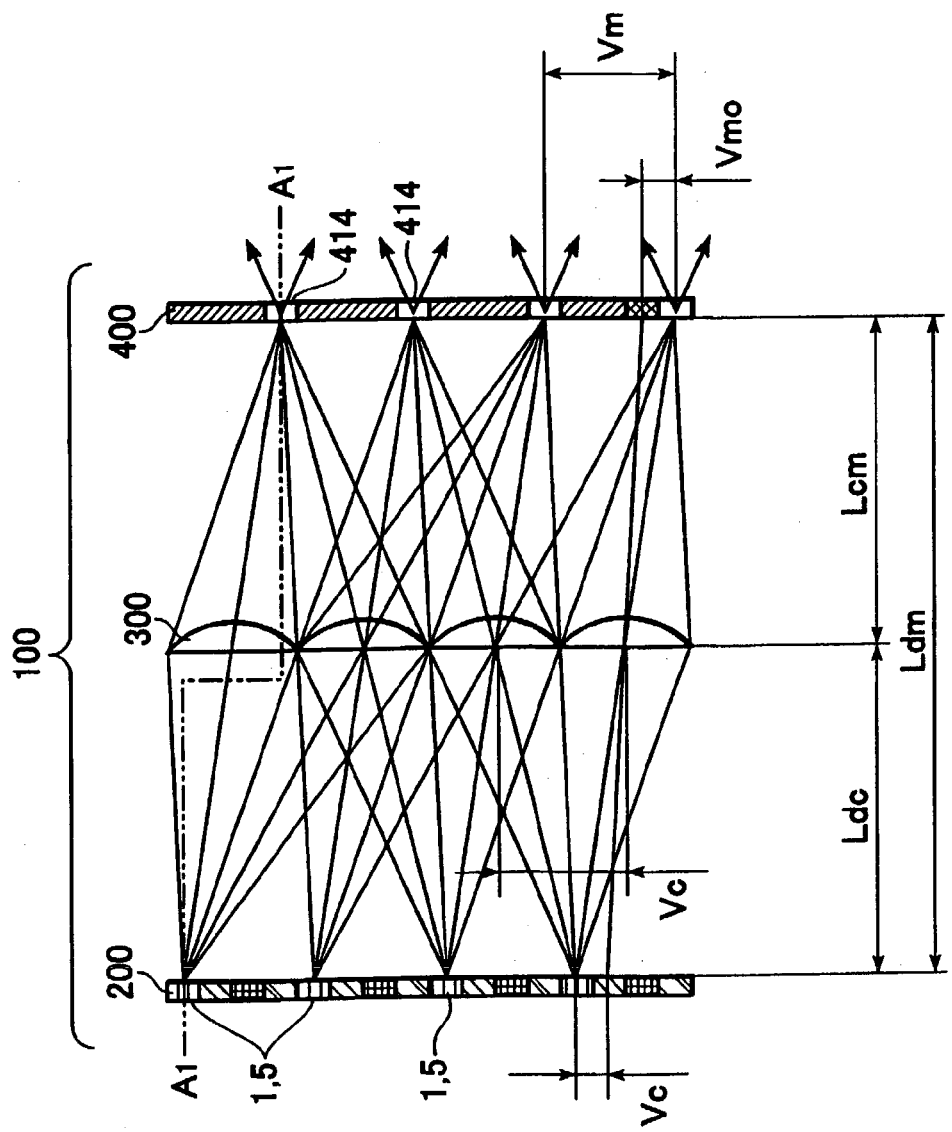
FIG. 4 is a vertical sectional view showing the travel of light beams from the display in the stereoscopic image display apparatus.

FIG. 4 is a vertical sectional view of apertures 414, each aperture being located at the fourth line, the first column of each mask block 410.

The light fluxes from a pixel 1 and a pixel 5 of the first line in each pixel block 210 on the display unit 200 are substantially condensed at the aperture 414 of the fourth line of each mask block 410 (4×n=4th, 8th, 12th, 16th . . . line in the entire mask 400, where n being an integer of 1 or more), and pass through the aperture 414. The light fluxes passing through the aperture 414 advance, diverging in the vertical direction.

At this time, the vertical centers of the pixels 1, 5 of the display unit 200, the vertical centers of the cylindrical lenses of the lenticular lens assembly 300, and the vertical centers of the apertures 414 of the mask 400 lie on straight lines, with their ends at the mask 400 being lower by the difference in level between the pixels 1, 5 and the apertures 414. Furthermore, in the vertical plane, the cylindrical lenses of the lenticular lens assembly 300 establish an optically conjugating positional relationship between the display surface of the display unit 200 and the light shielding surface of the mask 400.

Figure 5:
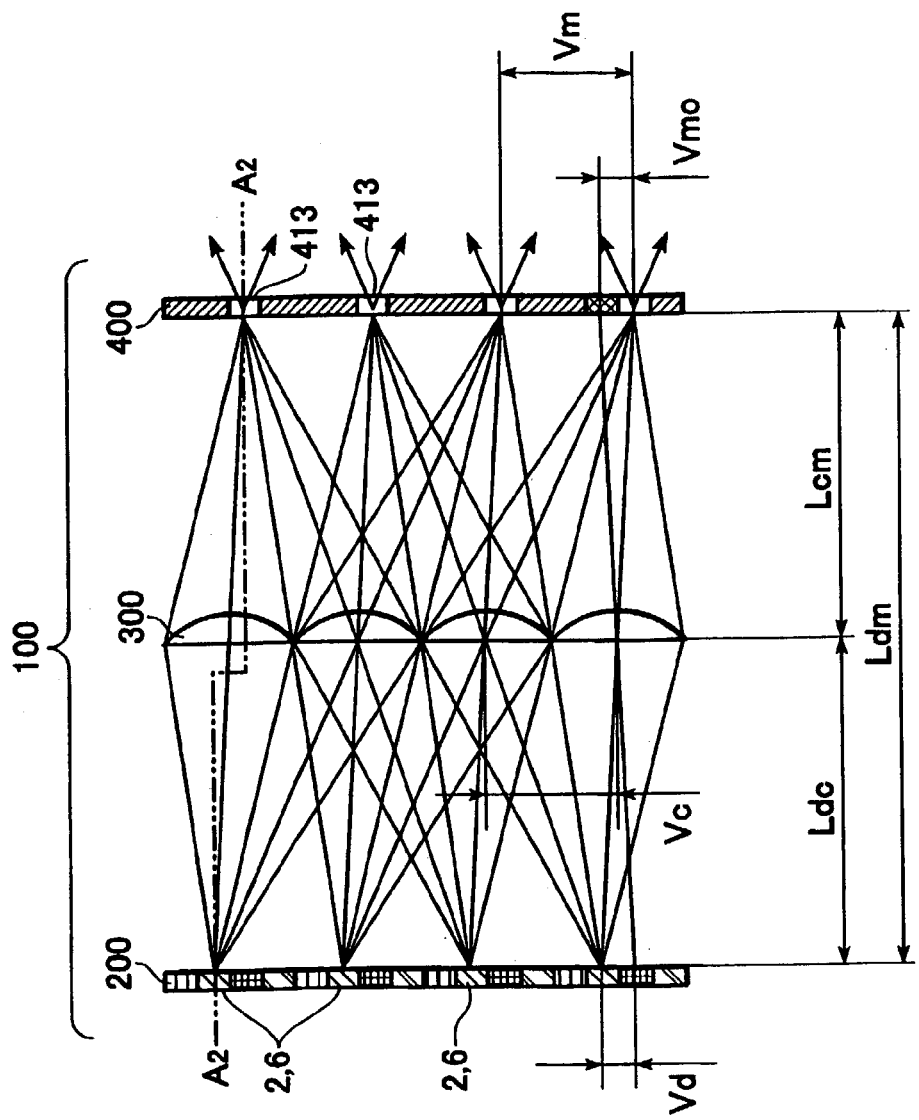
FIG. 5 is another vertical sectional view showing the travel of light beams from the display in the stereoscopic image display apparatus.

FIG. 5 is a vertical sectional view of apertures 413, each being located at the third line, second column of each mask block 410.

The light fluxes from a pixel 2 and a pixel 6 of the second line in each pixel block 210 on the display unit 200 are substantially condensed at the aperture 413 of the third line of each mask block 410 (4<=p>×n−1=3rd, 7th, 11th, 15th . . . line in the entire mask 400), and pass through the aperture 413. The light fluxes passing through the aperture 413 advance, diverging in the vertical direction.

At this time, the vertical centers of the pixels 2, 6 of the display unit 200, the vertical centers of the cylindrical lenses of the lenticular lens assembly 300, and the vertical centers of the apertures 413 of the mask 400 lie on straight lines, with their ends at the mask 400 being slightly lower by the difference in level between the pixels 2, 6 and the aperture 413. Furthermore, in the vertical plane, the cylindrical lenses of the lenticular lens assembly 300 establish an optically conjugating positional relationship between the display surface of the display unit 200 and the light shielding surface of the mask 400.

Figure 6:
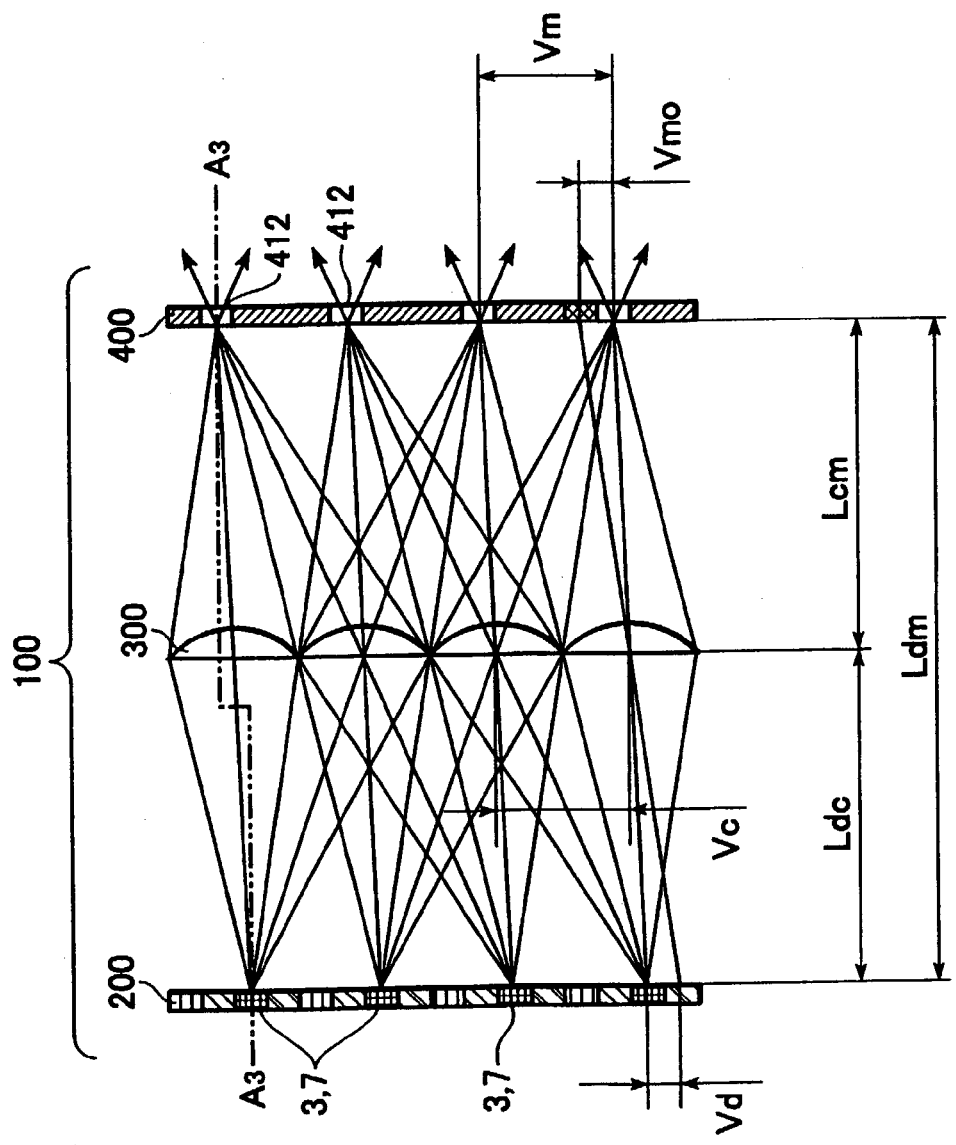
FIG. 6 is still another vertical sectional view showing the travel of light beams from the display in the stereoscopic image display apparatus.

FIG. 6 is a vertical sectional view of apertures 412 located at the second line, third column of each mask block 410.

The light fluxes from a pixel 3 and a pixel 7 of the third line in each pixel block 210 on the display unit 200 are substantially condensed at the aperture 412 of the second line of each mask block 410 (4×n−2=2nd, 6th, 10th, 14th . . . line in the entire mask 400), and pass through the aperture 412. The light fluxes passing through the aperture 412 advance, diverging in the vertical direction.

At this time, the vertical centers of the pixels 3, 7 of the display unit 200, the vertical centers of the cylindrical lenses of the lenticular lens assembly 300, and the vertical centers of the apertures 412 of the mask 400 lie on straight lines, with their ends at the mask 400 being slightly higher by the difference in level between the pixels 3, 7 and the apertures 412. Furthermore, in the vertical plane, the cylindrical lenses of the lenticular lens assembly 300 establish an optically conjugating positional relationship between the display surface of the display unit 200 and the light shielding surface of the mask 400.

Figure 7:
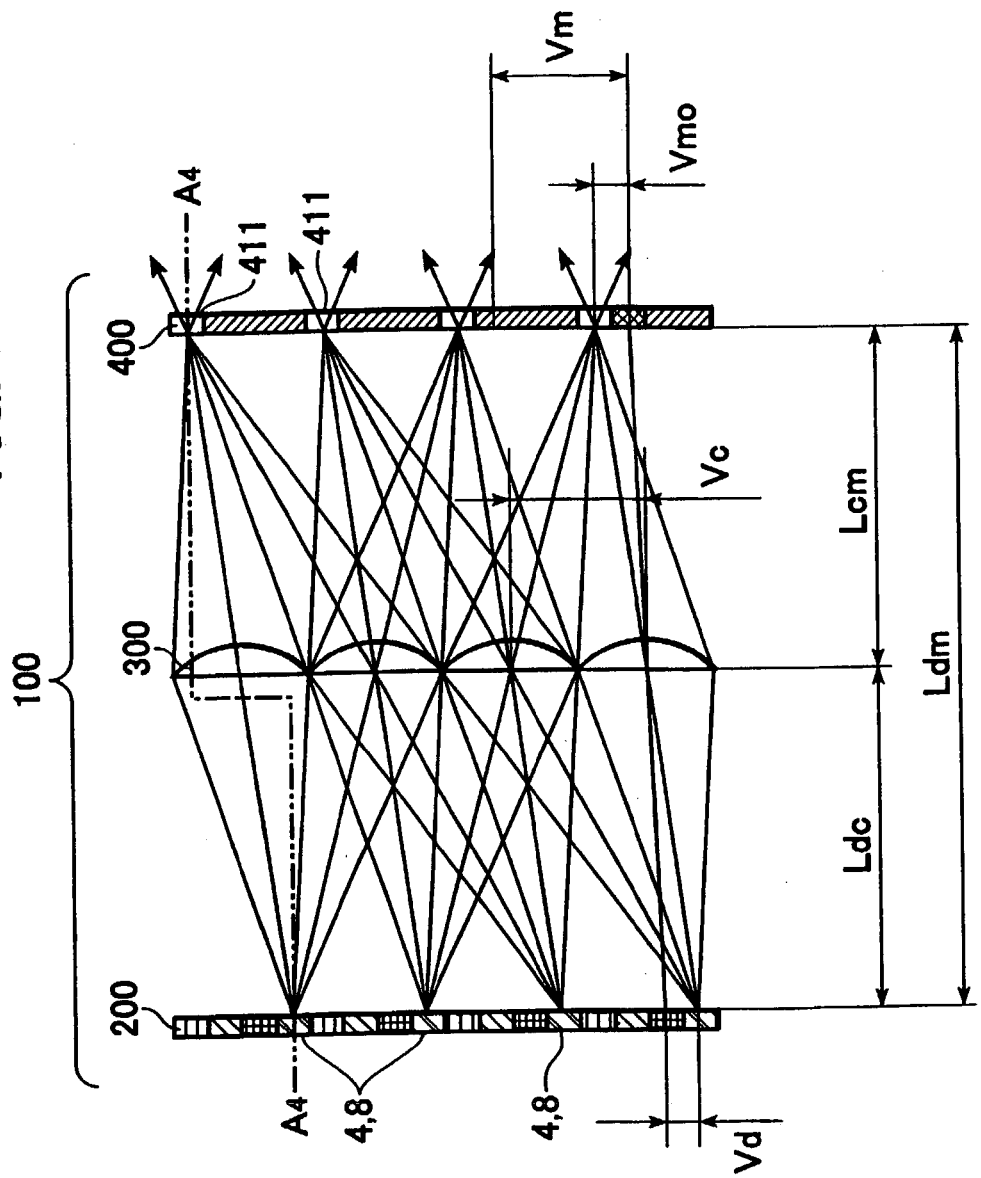
FIG. 7 is yet another vertical sectional view showing the travel of light beams from the display in the stereoscopic image display apparatus.

FIG. 7 is a vertical sectional view of apertures 411 located at the first line, fourth column of each mask block 410.

The light fluxes from a pixel 4 and a pixel 8 of the fourth line in each pixel block 210 on the display unit 200 are substantially condensed at the aperture 411 of the first line of each mask block 410 (4×n−3=1st, 5th, 9th, 13th . . . line in the entire mask 400), and pass through the aperture 411. The light fluxes passing through the aperture 411 advance, diverging in the vertical direction.

At this time, the vertical centers of the pixels 4, 8 of the display unit 200, the vertical centers of the cylindrical lenses of the lenticular lens assembly 300, and the vertical centers of the apertures 411 of the mask 400 lie on straight lines, with their ends at the mask 400 being slightly higher by the difference in level between the pixels 4, 8 and the apertures 411. Furthermore, in the vertical plane, the cylindrical lenses of the lenticular lens assembly 300 establish an optically conjugating positional relationship between the display surface of the display unit 200 and the light shielding surface of the mask 400.

The expressions shown below hold when the distance between the display surface of the display unit 200 and the lenticular lens assembly 300 is denoted as Ldc, the distance between the lenticular lens assembly 300 and the light shielding surface of the mask 400 is denoted as Lcm, the distance between the display surface of the display unit 200 and the light shielding surface of the mask 400 is denoted as Ldm, the focal length of the lenticular lens assembly 300 in the vertical section is denoted as fc, the length of the longitudinal side of a pixel (the vertical pitch of a pixel) of the display unit 200 is denoted as Vd, the longitudinal length of a single cylindrical lens constituting the lenticular lens assembly 300 (the vertical pitch of the lenticular lens assembly 300) is denoted as Vc, and the vertical pitch of the apertures of the mask 400 is denoted as Vmo.

$$1/fc=1/Ldc+1/Lcm \tag{1}$$

$$Vd:Ldc=Vmo:Lcm \tag{2}$$

$$2\times p\times Vd:Ldm=Vc:Lcm \tag{3-1}$$

$$2\times Vm:Ldm=Vc:Ldc \tag{3-2}$$

$$p\times Vd:Ldc=Vm:Lcm \tag{4}$$

where expression (3)-1 and expression (3)-2 are dependent, and either one of them independently holds.

(Forming Multi-View Image Arrays)

Figure 8:
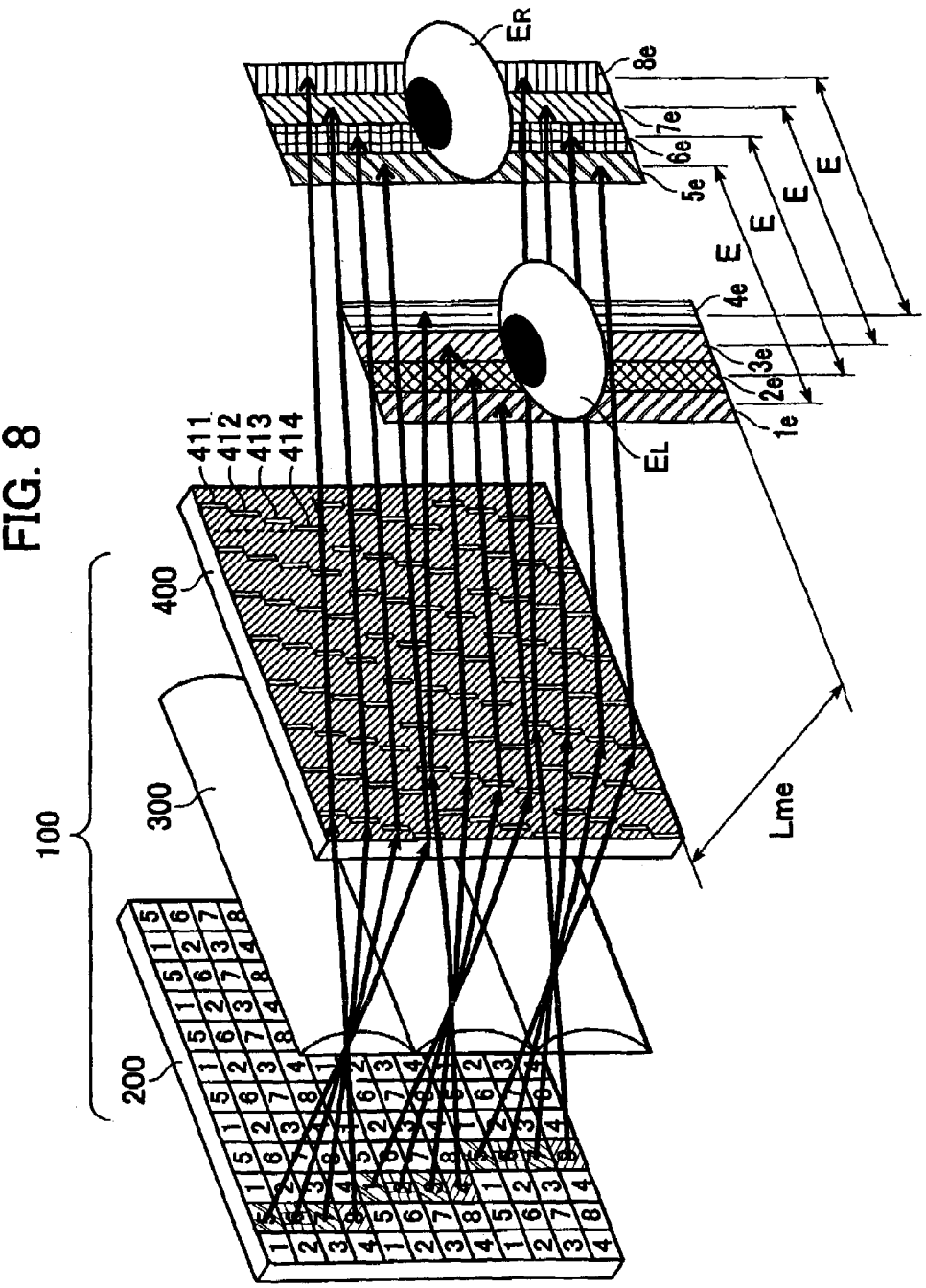
FIG. 8 is a perspective view illustrating the observation regions formed by the stereoscopic image display apparatus.

Referring to FIG. 8, the light fluxes radially emitted from the pixels on the display unit 200 are subjected to the vertical lens action through the lenticular lens assembly 300, and formed into directive light fluxes directed toward left eye EL and right eye ER of an observer through the mask 400. These light fluxes directed toward the left eye EL and the right eye ER provide left eye observation subregions 1e, 2e, 3e, 4e that can be observed by the left eye EL and right eye observation subregions 5e, 6e, 7e, 8e that can be observed by the right eye ER at the position defined by the distance Lme from the mask 400. This permits the parallax image observation at multiple eye views in the left eye and right eye observation regions.

FIGS. 9, 10, 11 and 12 are sectional views at the apertures of the mask 400. In conjunction with these figures, the description will be given of the principle applied to form the observation subregions in the vicinity of the left eye EL and the right eye ER of an observer.

Figure 9:
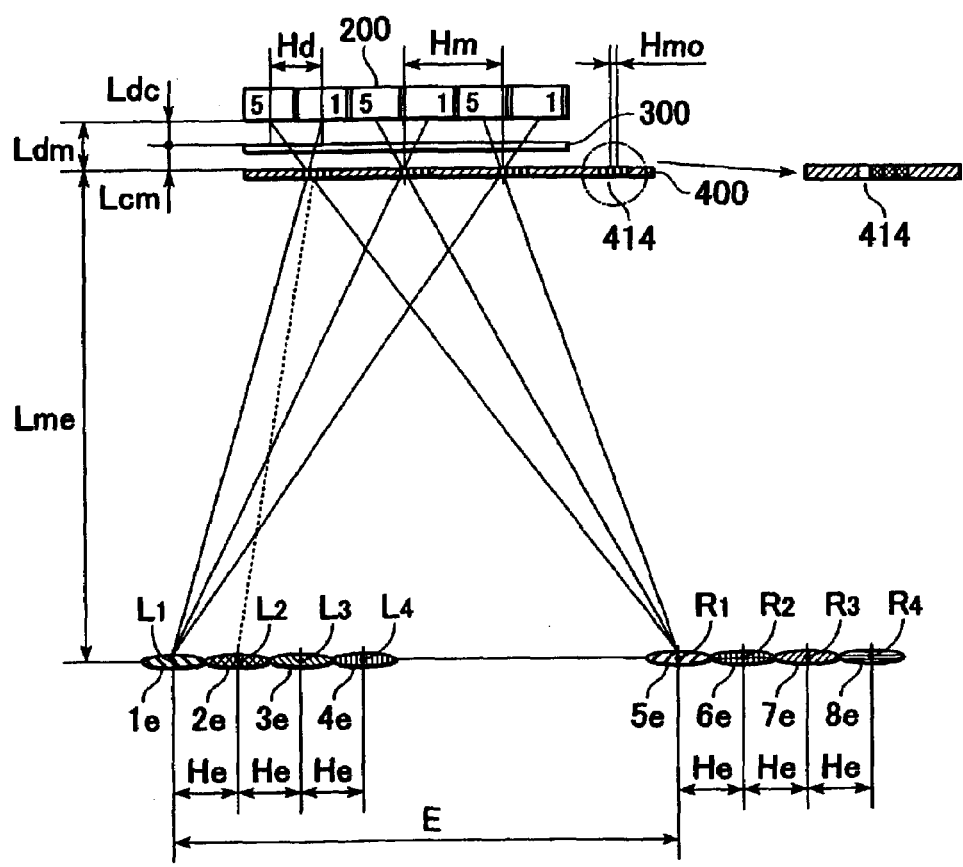
FIG. 9 is a sectional view taken at line A1—A1 in FIG. 4.

FIG. 9 is a horizontal sectional view taken at line A1—A1 shown in FIG. 4. In FIG. 9, the positions of the apertures 411, 412 and 413 that do not exist in the section are indicated in terms of hatched areas.

The light fluxes from the pixels 1 and 5 of the first line in each pixel block 210 on the display unit 200 pass through the aperture 414 of the fourth line (4×nth line in the entire mask 400, where n is an integer of 1 or more) of each mask block 410 in the mask 400. The light flux from the pixel 1 reaches an observation central point L1 in the vicinity of the left eye that is located at the distance Lme from the mask 400. The light flux from the pixel 5 reaches an observation central point R1 in the vicinity of the right eye that is located at the distance Lme from the mask 400.

Thus, the light fluxes from all the pixels 1 on the display unit 200 pass through the apertures 414 of the mask 400 and form a left eye strip-shaped observation subregion 1e having a width He. Similarly, the light fluxes from the pixels 5 form a right eye strip-shaped observation subregion 5e having the width He.

At this time, a positional relationship is established in which the horizontal centers of the pixels 1 and 5 of the display unit 200, the horizontal centers of the apertures 414 of the mask 400, and the points L1 and R1 lie on straight lines, respectively.

Figure 10:
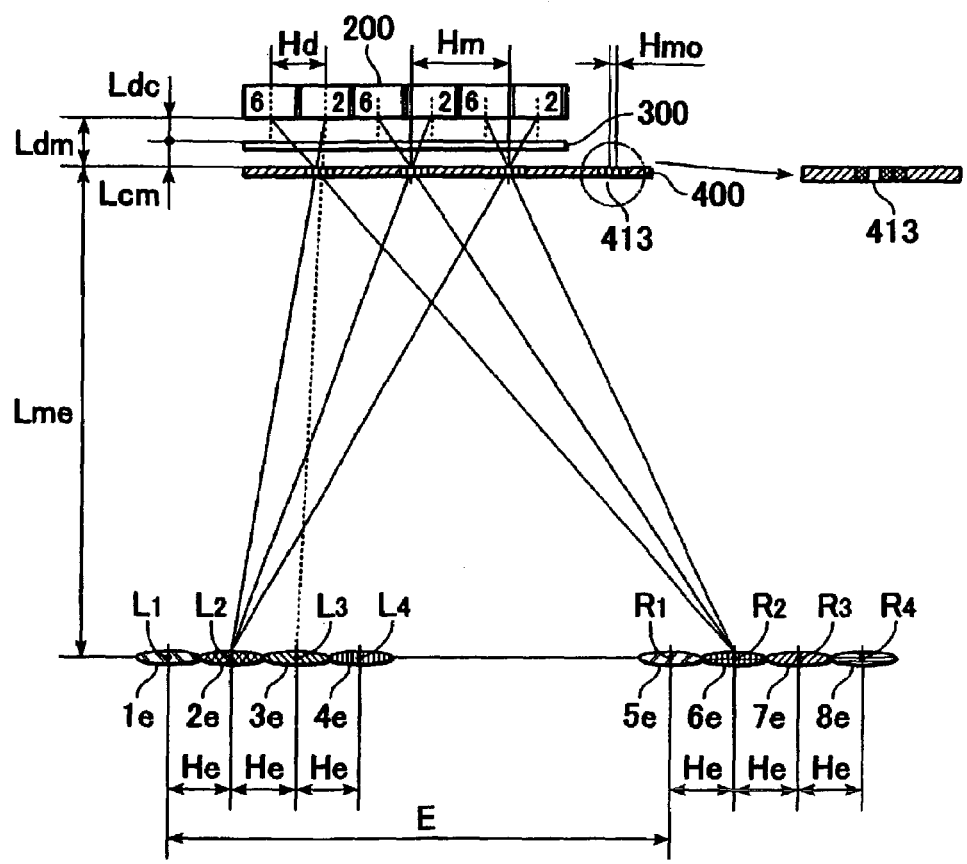
FIG. 10 is a sectional view taken at line A2—A2 in FIG. 5.

FIG. 10 is a horizontal sectional view taken at line A2—A2 shown in FIG. 5. In FIG. 10, the positions of the apertures 411, 412 and 414 that do not exist in the section are indicated in terms of hatched areas.

The light fluxes from the pixels 2 and 6 of the second line in each pixel block 210 on the display unit 200 pass through the aperture 413 of the third line (4×n−1(th)) line in the entire mask 400) of each mask block 410 in the mask 400. The light flux from the pixel 2 reaches an observation central point L2 in the vicinity of the left eye that is located at the distance Lme from the mask 400. The light flux from the pixel 6 reaches an observation central point R2 in the vicinity of the right eye that is located at the distance Lme from the mask 400.

Thus, the light fluxes from all the pixels 2 on the display unit 200 pass through the apertures 413 of the mask 400 and form a left eye strip-shaped observation subregion 2e having the width He. Similarly, the light beams from the pixels 6 form a right eye strip-shaped observation subregion 6e having the width He.

At this time, a positional relationship is established in which the horizontal centers of the pixels 2 and 6 of the display unit 200, the horizontal centers of the apertures 413 of the mask 400, and the points L2 and R2 are aligned, respectively.

Figure 11:
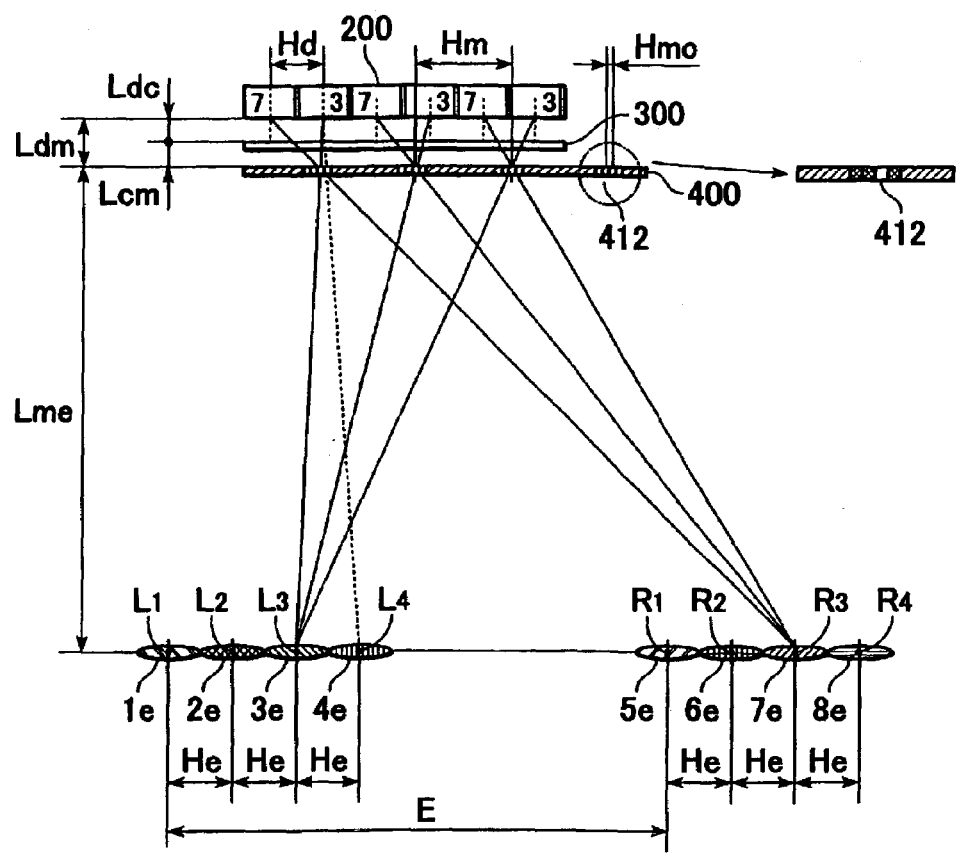
FIG. 11 is a sectional view taken at line A3—A3 in FIG. 6.

FIG. 11 is a horizontal sectional view taken at line A3—A3 shown in FIG. 6. In FIG. 11, the positions of the apertures 411, 413 and 414 that do not exist in the section are indicated in terms of hatched areas.

The light fluxes from the pixels 3 and 7 of the third line in each pixel block 210 on the display unit 200 pass through the aperture 412 of the second line (4×n−2(th) line in the entire mask 400) of each mask block 410 in the mask 400. The light flux from the pixel 3 reaches an observation central point L3 in the vicinity of the left eye that is located at the distance Lme from the mask 400. The light flux from the pixel 7 reaches an observation central point R3 in the vicinity of the right eye that is located at the distance Lme from the mask 400.

Thus, the light fluxes from all the pixels 3 on the display unit 200 pass through the apertures 412 of the mask 400 and form a left eye strip-shaped observation subregion 3e having the width He. Similarly, the light beams from the pixels 7 form a right eye strip-shaped observation subregion 7e having the width He.

At this time, a positional relationship is established in which the horizontal centers of the pixels 3 and 7 of the display unit 200, the horizontal centers of the apertures 412 of the mask 400, and the points L3 and R3 are aligned, respectively.

Figure 12:
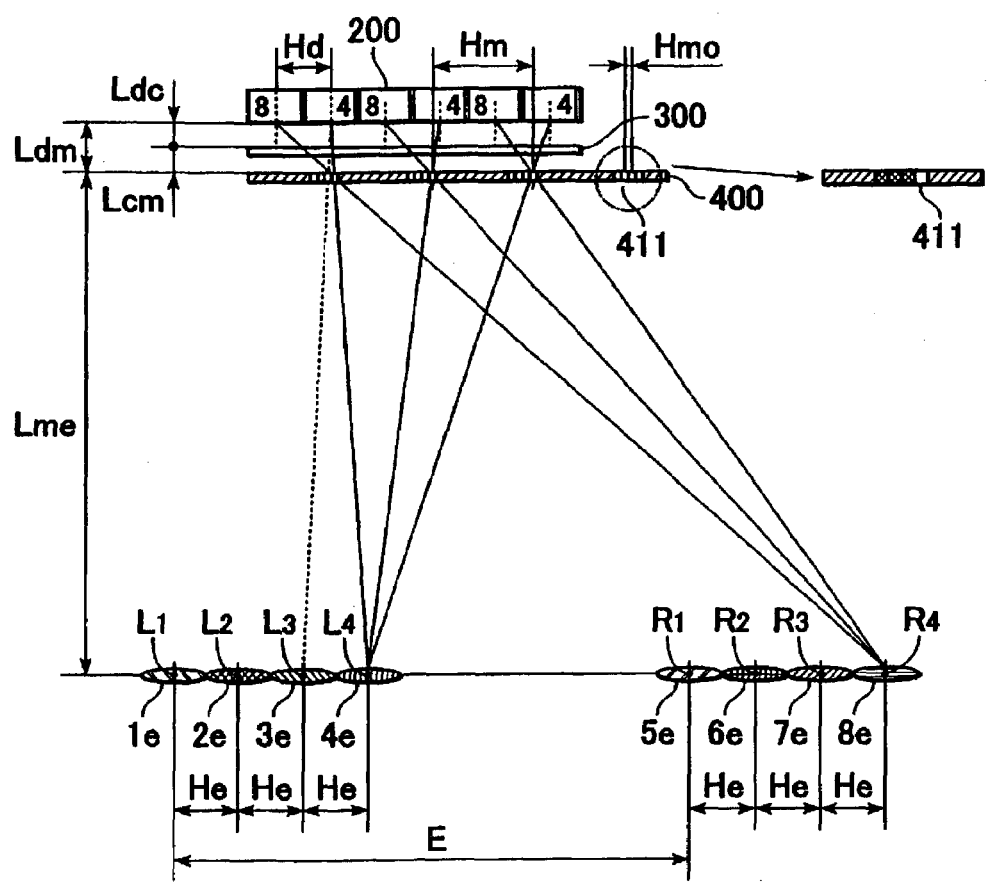
FIG. 12 is a sectional view taken at line A4—A4 in FIG. 7.

FIG. 12 is a horizontal sectional view taken at line A4—A4 shown in FIG. 7. In FIG. 12, the positions of the apertures 412, 413 and 414 that do not exist in the section are indicated in terms of hatched areas.

The light fluxes from the pixels 4 and 8 of the fourth line in each pixel block 210 on the display unit 200 pass through the aperture 411 of the first line (4×n−3(th) line in the entire mask 400) of each mask block 410 in the mask 400. The light flux from the pixel 4 reaches an observation central point L4 in the vicinity of the left eye that is located at the distance Lme from the mask 400. The light flux from the pixel 8 reaches an observation central point R4 in the vicinity of the right eye that is located at the distance Lme from the mask 400.

Thus, the light fluxes from all the pixels 4 on the display unit 200 pass through the apertures 411 of the mask 400 and form a left eye strip-shaped observation subregion 4e having the width He. Similarly, the light beams from the pixels 8 form a right eye strip-shaped observation subregion 8e having the width He.

At this time, a positional relationship is established in which the horizontal centers of the pixels 4 and 8 of the display unit 200, the horizontal centers of the apertures 411 of the mask 400, and the points L4 and R4 are aligned, respectively.

Referring back to FIG. 8, in the right eye observation region and the left eye observation region, the observation subregions 1e, 2e, 3e, 4e and 5e, 6e, 7e, 8e are adjacent to each other. In order to achieve natural stereoscopic observation, it is desirable to set the same intervals E (the intervals between the right and left observation central points) between paired left eye observation subregions and right eye observation subregions, namely, 1e and 5e, 2e and 6e, 3e and 7e, and 4e and 8e in the left eye observation region and the right eye observation region.

In other words, in the pixel block 210, the interval or the pixel pitch of the paired pixels for displaying paired parallax images that are disposed in, for example, the first and second columns of the first line is identical to the intervals or the pixel pitches of the paired pixels in the first and second columns of the second, third and fourth lines. The interval between all paired pixels is preferably set so that, as mentioned above, the intervals E between the left eye observation subregions and the right eye observation subregions that are paired between the left eye observation region and the right eye observation region are all the same.

As described above, disposing the pixels on the display unit 200 and disposing the apertures in the mask 400 cause the images from the pixels vertically arranged on the display unit 200 to be horizontally arranged at the position of an observer.

The expressions shown below hold when the distance between the display surface of the display unit 200 and the light shielding surface of the mask 400 is denoted as Ldm, the distance from the light shielding surface of the mask 400 to an observation region is denoted as Lme, the center-to-center distance of laterally adjacent pixels (the horizontal pitch of a pixel) of the display unit 200 is denoted as Hd, the length of a lateral side of the mask block 410 of the mask 400 is denoted as Hm (the horizontal pitch of the mask block 410, as shown in FIG. 2), the horizontal center-to-center distance of the individual apertures 411, 412, 413 and 414 of the mask 400 is denoted as Hmo (the horizontal pitch of the apertures, as shown in FIG. 2), the horizontal pitch of the observation central points L1, L2, L3, L4 and R1, R2, R3, R4 is denoted as He, and the distance from L1 to R1 is denoted as E (E being substantially equal to the distance between observer's eyes).

$$Ldc+Lcm=Ldm \tag{5}$$

$$Hd:Ldm=E:Lme \tag{6}$$

$$2 \times Hd:Ldm+Lme=Hm:Lme \tag{7}$$

$$Hmo:Ldm=He:Ldm+Lme \tag{8}$$

(Horizontal Open Area Ratio of the Apertures)

Figure 13:
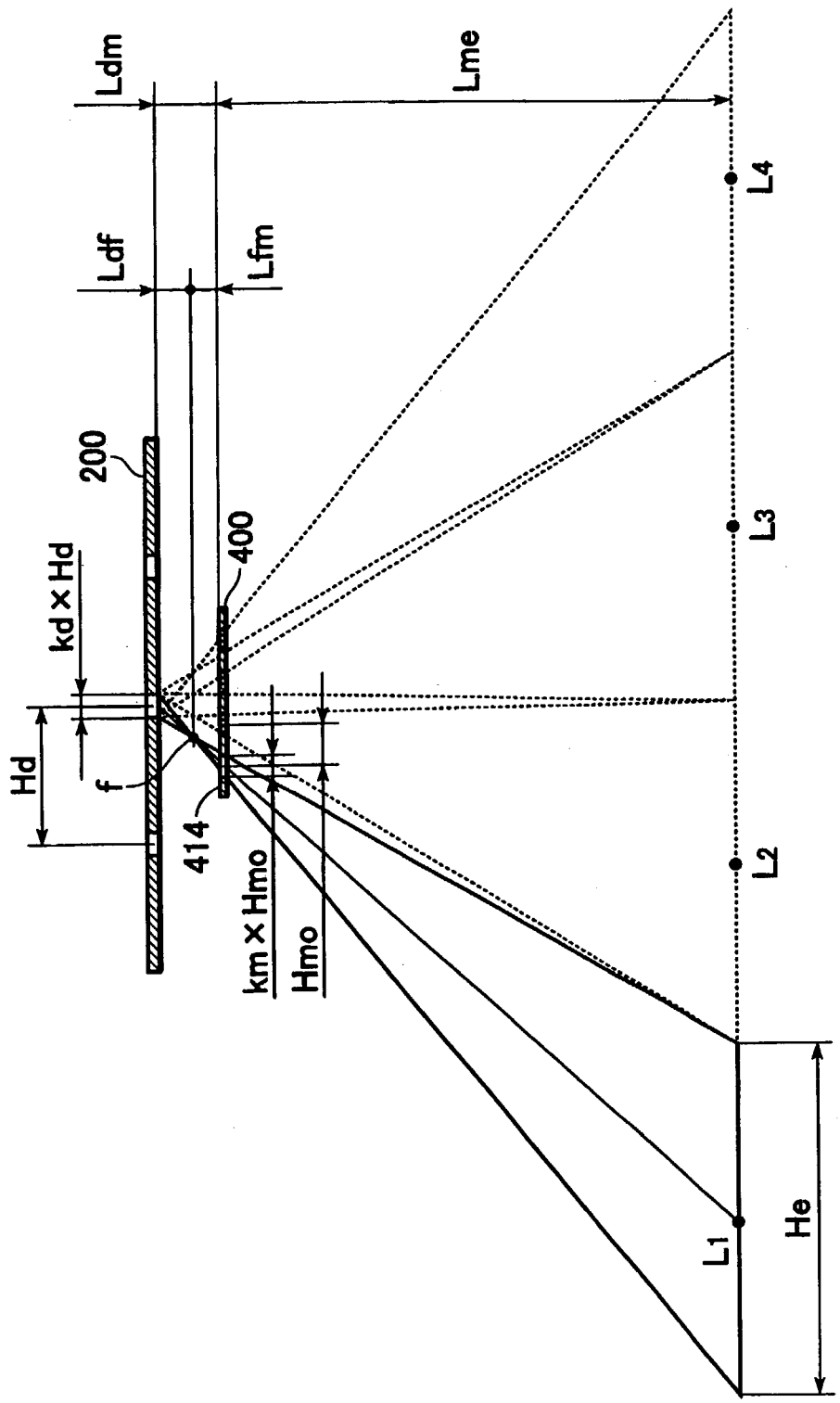
FIG. 13 is a sectional view showing the vicinity of left eye in the section taken at line A1—A1 shown in FIG. 4.

FIG. 13 shows the section taken at line A1—A1 shown in FIG. 4 in the vicinity of the left eye EL of an observer, and detailedly illustrates the apertures of the pixels of the display unit 200 and the apertures of the mask 400. The positions of the apertures 412, 413 and 414 that do not exist in the section shown in FIG. 13 are shown in terms of hatched areas.

For the apertures of the pixels of the display unit 200, a display unit adapted to emit light only through predetermined apertures may be used, or a light shielding mask having a predetermined aperture width may be provided in front of the display unit 200. Further alternatively, only some of pixels may be lit to provide the apertures.

In FIG. 13, kd denotes the horizontal open area ratio of the aperture of a pixel of the display unit 200, and km denotes the horizontal open area ratio of an aperture of the mask 400. Thus, the horizontal distance of the aperture of a pixel of the display unit 200 is defined by kd×Hd, and the horizontal distance of an aperture of the mask 400 is determined by km×Hmo.

As illustrated in the figure, the left end of the aperture of the pixel of the display unit 200, the right end of the aperture of the mask 400, and the right end of the left eye observation subregion 1*e* having the width He and involving the observation central point L1 are on a straight line.

Similarly, the right end of the aperture of the pixel of the display unit 200, the left end of the aperture of the mask 400, and the left end of the left eye observation subregion 1*e* having the width He and involving the observation central point L1 are on a straight line.

The expressions shown below hold when the intersection point of the above straight lines is denoted as f, the distance from the display unit 200 to the intersection point f is denoted as Ldf, and the distance from the intersection point f to the mask 400 is denoted as Lfm.

$$Ldm=Ldf+Lfm \tag{9}$$

$$kd \times Hd:Ldf=km \times Hmo:Lfm \tag{10}$$

$$kd \times Hd:Ldf=He:Lme+Lfm \tag{11}$$

The restrictions on the apertures lower the utilization factor of light. On the other hand, whereas a typical stereoscopic display unit is adapted to emit light to regions that cannot be viewed by an observer, the present embodiment is adapted to direct light toward the eyes of an observer. This means that the embodiment allows the observer to fully observe displayed images despite the lower utilization factor of light.

(Region That Exists Between Right and Left Eyes and That the Light from Pixels Does Not Reach)

Figure 14:
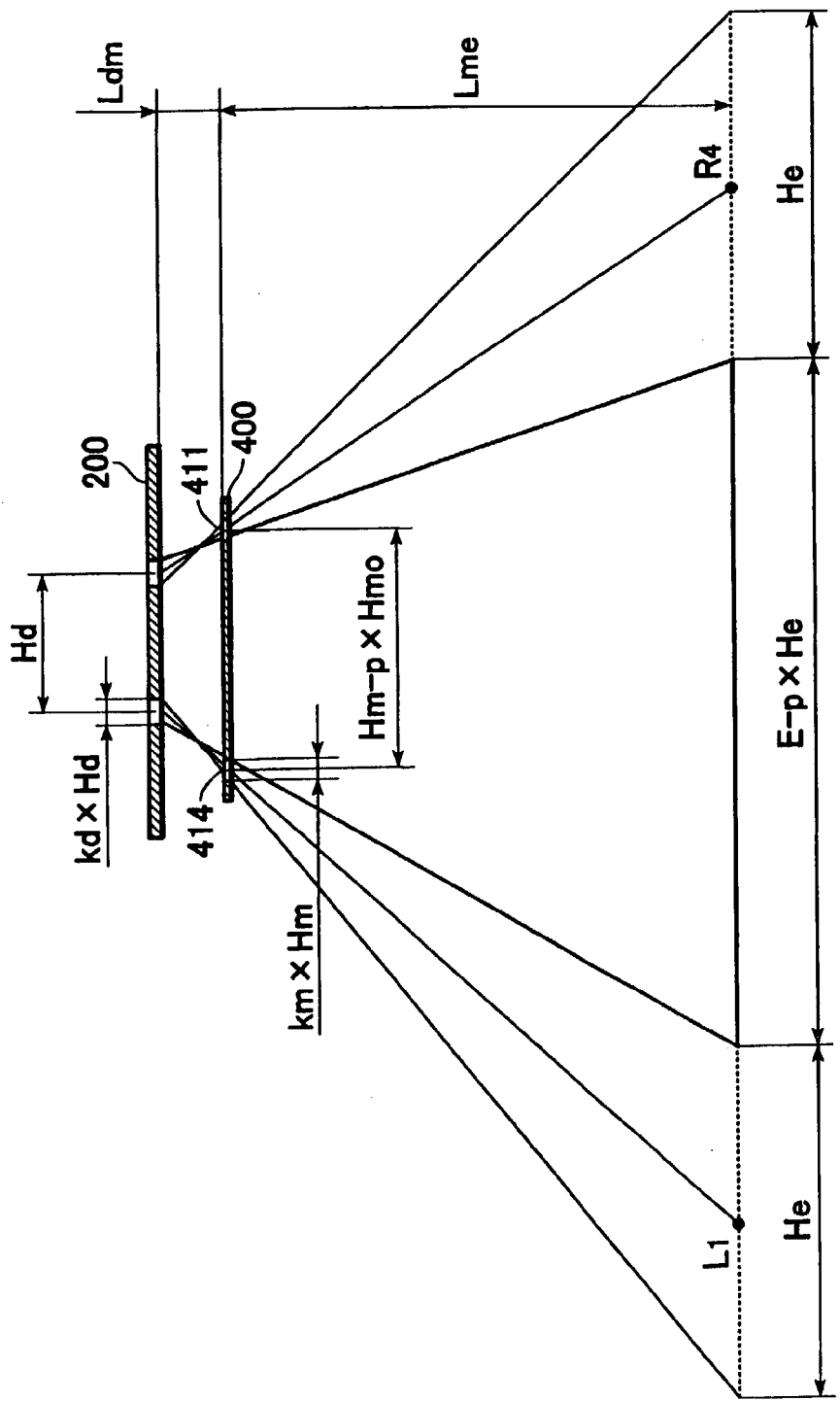
FIG. 14 is a sectional view showing a region that exists between right and left eyes and that is not reachable by light beams from pixels in the section taken at line A1—A1 shown in FIG. 4.

Referring now to FIG. 14, the region that is located between right and left eyes and that the light from the pixels of the display unit 200 does not reach will be described.

FIG. 14 indicates the presence of the region between the right and left eyes, the region being defined by a distance determined by E−p×He. The light from the pixels of the display unit 200 does not reach the region. Hms shown in FIG. 2 is expressed as shown below:

$$Hms=Hm-(p-1+km) \times Hmo$$

In this embodiment, the stereoscopic image display apparatus 100 is constructed such that the foregoing conditional expressions (1), (2), (3)-1, (3)-2, (4), (5), (6), (7), (8), (9), (10) and (11) are satisfied.

The stereoscopic image display apparatus 100 having such a construction forms the region where the light from the pixels does not reach. The region is located in the vicinity of the left eye EL and the right eye ER of an observer, namely, between the left eye observation subregions 1*e*, 2*e*, 3*e*, 4*e* and the right eye observation subregions 5*e*, 6*e*, 7*e*, 8*e*, which are the regions where the light from the pixels of the display unit 200 does not reach.

Figure 15:
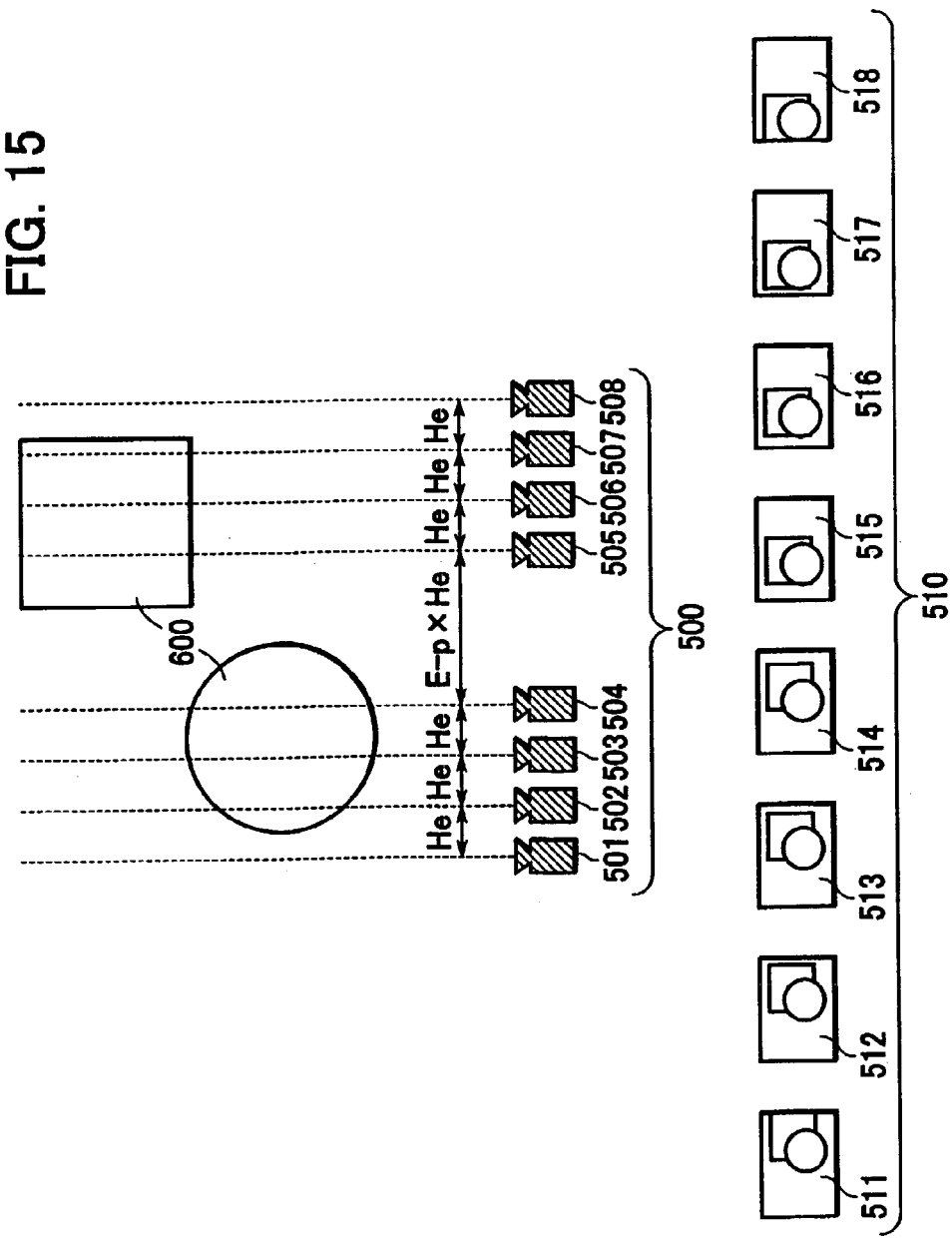
FIG. 15 is an explanatory view showing an image displayed by the stereoscopic image display apparatus.

Referring now to FIG. 15, the images displayed on the stereoscopic image display apparatus 100 will be described. A group of shooting cameras 500 in the figure includes eight cameras, 501 to 508.

Reference numeral 600 denotes an object. The camera 501 shoots an image 1 (to be discussed hereinafter) viewed from a viewpoint position L1 (refer to FIG. 9). Similarly, the camera 502 shoots an image 2 viewed from a viewpoint position L2, the camera 503 shoots an image 3 viewed from a viewpoint position L3, the camera 504 shoots an image 4 viewed from a viewpoint position L4, the camera 505 shoots an image 5 viewed from a viewpoint position R1, the camera 506 shoots an image 6 viewed from a viewpoint position R2, the camera 507 shoots an image 7 viewed from a viewpoint position R3, and the camera 508 shoots an image 8 viewed from a viewpoint position R4.

Hence, the shooting optical axes of the cameras 501, 502, 503 and 504 are disposed at equal intervals He in the same horizontal plane. Similarly, the shooting optical axes of the cameras 505, 506, 507 and 508 are also disposed at the equal intervals He in the same plane.

The shooting optical axes of the camera 504 and the camera 505 are disposed in the same plane at an interval of E−p×He.

Reference numeral 510 is a group of parallax images obtained when the object 600 is shot by the group of cameras 500. An image 511 (the foregoing image 1; the same applies to the rest) has been obtained by the camera 501, an image 512 (image 2) by the camera 502, an image 513 (image 3) by the camera 503, an image 514 (image 4) by the camera 504, an image 515 (image 5) by the camera 505, an image 516 (image 6) by the camera 506, an image 517 (image 7) by the camera 507, and an image 518 (image 8) by the camera 508.

When the group of parallax images 510 is displayed on the stereoscopic image display apparatus 100 in which the distance E from the point L1 to the point R1 is substantially set to be equal to the distance between the eyes of the observer, as explained in conjunction with FIG. 9, an observer will be able to observe four images per eye during a horizontal travel of a distance of 4×He. The images observed by the observer change when the observer moves in the horizontal direction for the distance He or more within the above range.

For instance, if the observer horizontally moves toward the right in the figure by the distance 2×He when the observer is observing the image 511 by the left eye EL and the image 515 by the right eye ER, then the image 513 will be observed by the left eye EL of the observer, while the image 517 is observed by the right eye ER.

More specifically, as the observer horizontally moves by He, the image observed will change accordingly to an image obtained by shooting an object from a position shifted by the distance He. In other words, "motion parallax representation" is possible.

Figure 16:
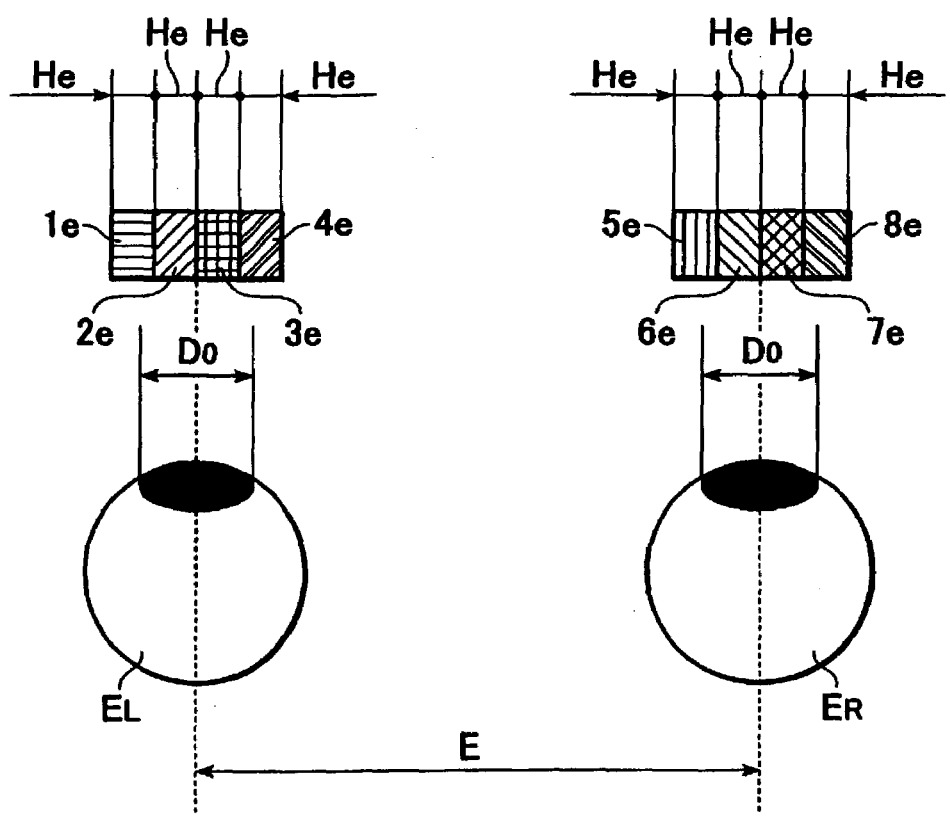
FIG. 16 is an explanatory view showing observation subregions formed by the stereoscopic image display apparatus.

FIG. 16 shows a case where the width He of the observation subregions 1e, 2e, 3e, 4e, 5e, 6e, 7e and 8e described in conjunction with FIGS. 9, 10, 11 and 12 has been set to be smaller than the half of pupil diameter D0 of an eye of an observer (D0/2>He). In this case, two or more images can be observed by an eye at a fixed position, permitting stereoscopic observation in a super-multi-view region.

Thus, in contrast to the prior art, the light from a display unit or pixels has been caused to also reach the region that cannot be viewed by an observer, namely, the region between the right and left eyes, in order to form parallax images, the present embodiment is designed so that the light from a display unit is caused to reach only the vicinity of the right eye ER and the left eye EL of an observer so as not to allow the light to reach the region between the right and left eyes. This permits the resolution of the display unit 200 to be efficiently utilized. Therefore, a stereoscopic image display apparatus with a higher resolution can be accomplished without the need for increasing the resolution of the display unit 200.

Moreover, the number of displayed images can be reduced, so that the capacity of an image data file can be reduced, permitting easier handling.

In this embodiment, the descriptions have been given of the stereoscopic image display apparatus that enables an observer to view four pairs of parallax images. The present invention, however, can be also applied to a stereoscopic image display apparatus that enables an observer to view a different number of pairs of parallax images. In addition, the present invention can be also applied to a stereoscopic image display apparatus that has pixels other than the pixel arrays on the display unit or aperture arrays other than the aperture arrays on the mask, which have been described in the embodiment.

Second Embodiment

The first embodiment has referred to the case where the lenticular lens assembly 300 and the mask 400 are disposed on the display surface of the display unit 200. In this case, the display unit 200 may use a LCD display device, a plasma display device, an organic EL display device, a projector, or any other display devices in which pixels are orderly arranged in horizontal and vertical matrixes.

Figure 17:
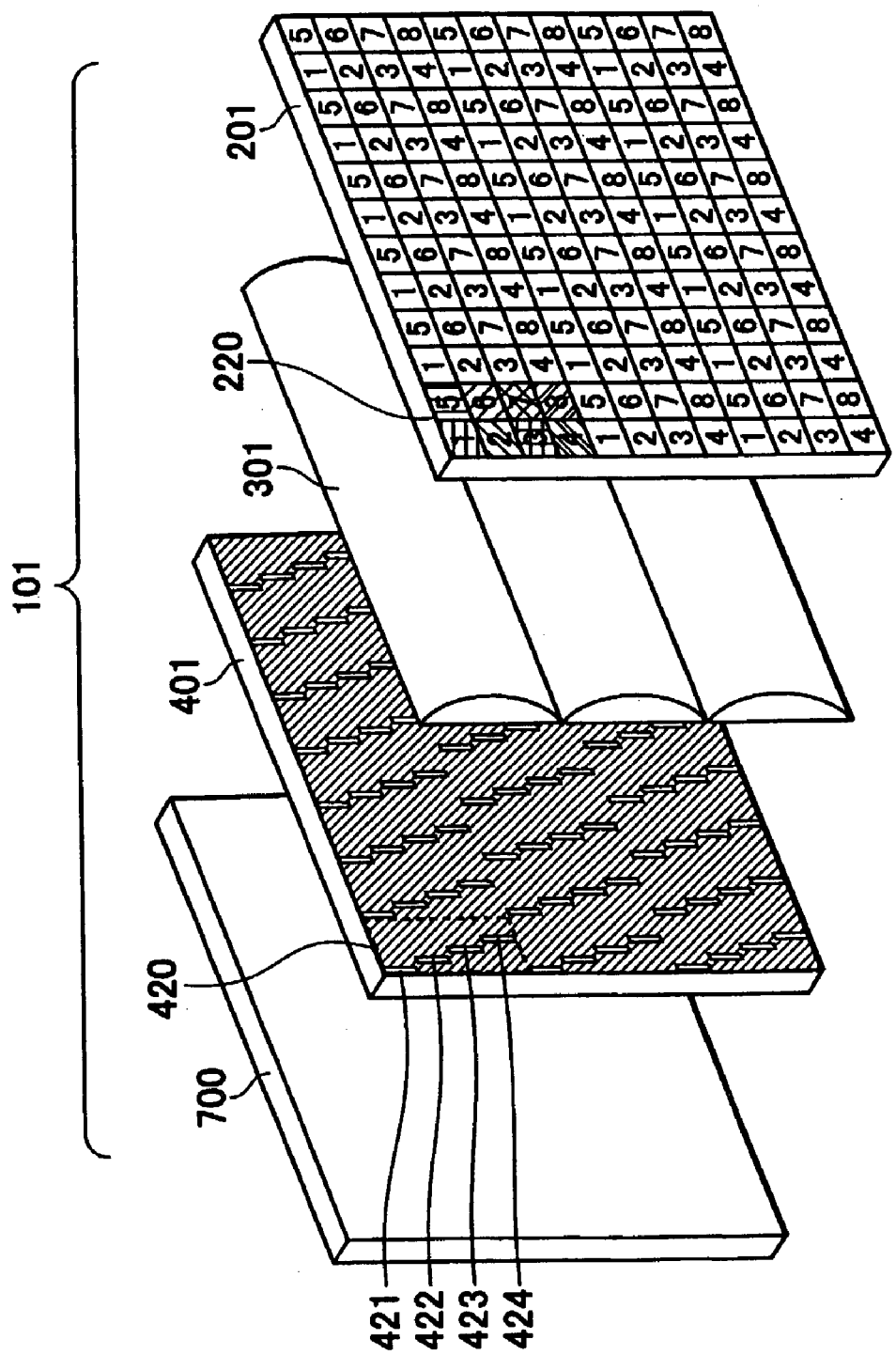
FIG. 17 is a perspective view showing the construction of a stereoscopic image display apparatus according to a second embodiment of the present invention.

FIG. 17 shows a schematic construction of a stereoscopic image display apparatus 101, which is a second embodiment of the present invention.

(Three-Dimensional Image Display Apparatus 101)

Referring to FIG. 17, the stereoscopic image display apparatus 101 uses a transmissive liquid crystal device in place of the display unit 200 used in the first embodiment. The stereoscopic image display apparatus 101 is constructed of a liquid crystal display unit 201, a lenticular lens assembly 301, a mask 401 and a backlight 700. The lenticular lens assembly 301 and the mask 401 are equivalent to the lenticular lens assembly 300 and the mask 400 in the first embodiment described above.

(Liquid Crystal Display Unit 201)

The liquid crystal display unit 201 is constructed of a transmissive liquid crystal device having pixels arranged in vertical and horizontal matrixes. As in the case of the first embodiment, observable pairs of parallax images are displayed on the liquid crystal display unit 201. If the number of the pairs of parallax images that can be observed in the observation region is denoted as 2p, then a total of 2×p pixels is arranged one by one as the pixels displaying substantially the same parts in the images of 2×p images on the liquid crystal display unit 201. The 2×p pixels are arranged in a predetermined order in the p-line, two-column matrix pattern to form a pixel block 220. A plurality of the pixel blocks 220 is arranged in a matrix pattern.

The hatched region on the liquid crystal display unit 201 shown in FIG. 17 indicates one pixel block 220. This embodiment shows the arrays of pixels when the number of the pairs of parallax images is set to p=4 and the total number of images is set to 2p=8.

In FIG. 17, numerals 1 to 8 shown on the pixel block 220 denote the pixels for displaying first to fourth right eye images observed by the right eye of an observer in a right eye observation region and fifth to eighth left eye images observed by the left eye of the observer.

One pixel block 220 is formed of eight pixels that display substantially the same parts of the first to eighth images (screens) and are disposed in a matrix pattern of 4 (p=4) lines and 2 columns. In the first column in the vertical direction, four pixels displaying substantially the same parts of the first, second, third and fourth images are arranged in this order. In the second column, the pixels displaying substantially the same parts of the fifth, sixth, seventh and eighth images arranged in this order.

In the pixel block 220, the interval (pixel pitch) between the paired pixels displaying the paired parallax images, which are disposed in, for example, the first and second columns of the first line is identical to the intervals between the paired pixels in the first and second columns of the second, third and fourth lines. The interval between paired pixels is set such that the interval E between the left eye observation subregions and the right eye observation subregions that are paired in the left eye observation region and the right eye observation region is equal in all pairs in the observation regions, as it will be discussed hereinafter.

The liquid crystal display unit 220 thus constructed displays a composite parallax image created by combining the quantity of parallax images (left eye images and right eye images) to be displayed.

(Mask 401)

The mask 401 is constructed of a plurality of mask blocks 420 arranged in a matrix pattern, each mask block 420 having four (p=4) apertures 421, 422, 423 and 424. The longitudinal dimension, i.e., the height of the mask block 420 is denoted as Vm' and the lateral dimension, i.e., the width thereof is denoted as Hm' as shown in FIG. 18.

Furthermore, the four apertures 421, 422, 423 and 424 in the mask block 420 are arranged such that they are vertically adjacent and horizontally shifted from each other. The mask block 420 is provided with a light shielding portion (Hms in the first embodiment) wherein the four apertures 421, 422, 423 and 424 do not exist in the vertical direction, as in the mask 400 of the first embodiment. The light shielding portion prevents the light from a group of pixels of the liquid crystal display unit 201 from reaching the region between the right and left observation regions.

(Forming Multi-Viewpoint Observation Subregions)

Figure 18:
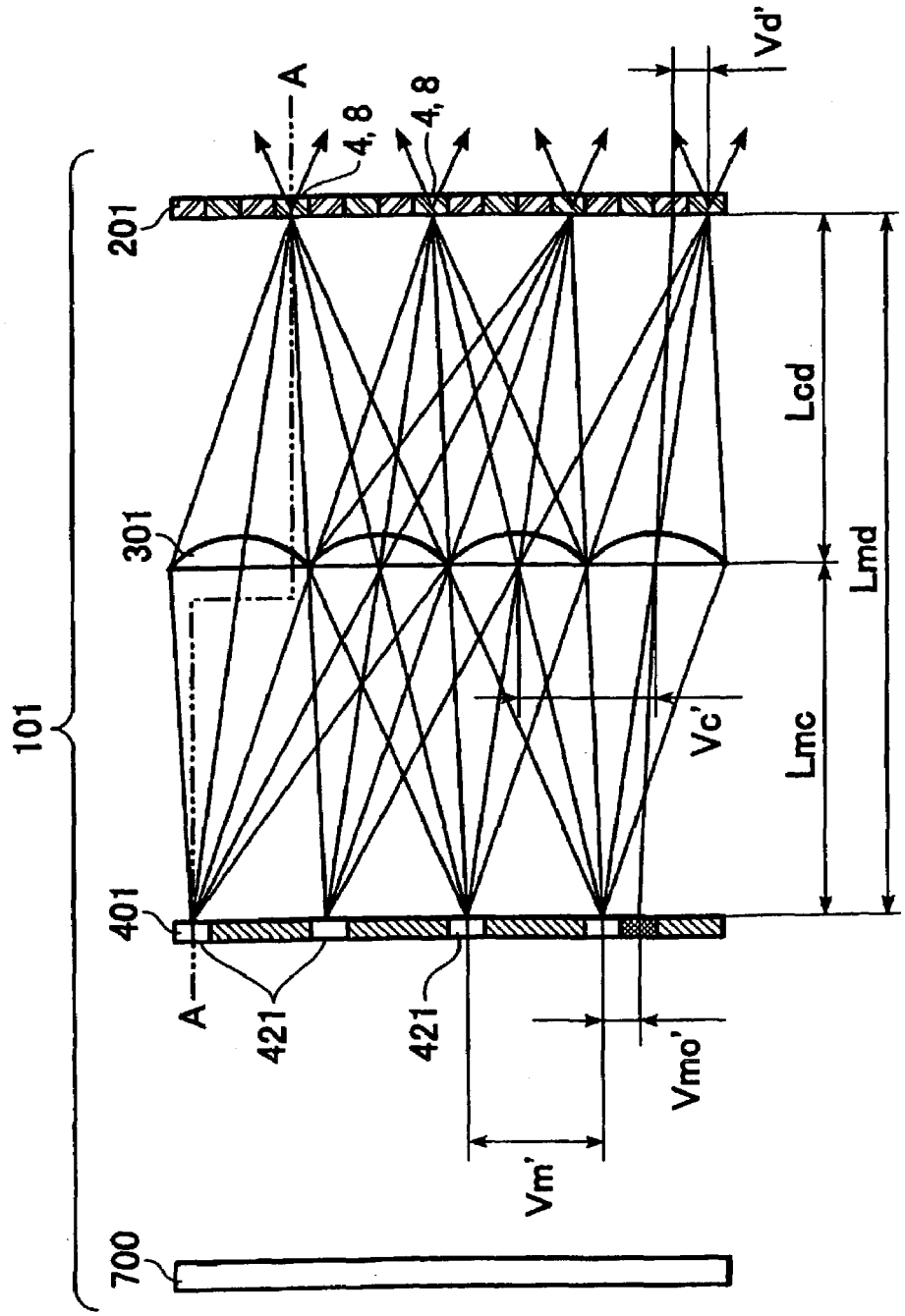
FIG. 18 is a vertical sectional view showing the construction of the stereoscopic image display apparatus according to the second embodiment.

FIG. 18 is a vertical sectional view of the apertures 421 in a 4(=p)×n−3(th) line (n being an integer of 1 or more) of the mask 401. The light fluxes from the backlight 700 that have passed through the apertures in the 4×n−3(th) line of the mask 401 are subjected to the action of the lenticular lens assembly 301 and substantially condensed at the pixels 4 and 8 in the 4th, 8th, 12th and 16th (4×n(th) lines) on the liquid crystal display unit 201. After passing through the liquid crystal display unit 201, the light fluxes vertically diverge as they advance.

At this time, the vertical centers of the pixels of the liquid crystal display unit 201, the vertical centers of the cylindrical lenses of the lenticular lens assembly 301, and the vertical centers of the apertures 421 of the mask 401 lie on straight lines. Furthermore, in the vertical plane, the cylindrical lenses of the lenticular lens assembly 301 establish an optically conjugating positional relationship between the display surface of the liquid crystal display unit 201 and the light shielding surface of the mask 401.

As in the case of the first embodiment, the same relationship holds also in vertical sections other than the vertical section of the 4×n−3(th) line of the mask 401. More specifically, the vertical centers of the pixels of the liquid crystal display unit 201, the vertical centers of the cylindrical lenses of the lenticular lens assembly 301, and the vertical centers of the apertures 422, 423 and 424 of the mask 401 lie on straight lines.

The expressions shown below hold when the distance between the light shielding surface of the mask 401 and the lenticular lens assembly 301 is denoted as Lmc, the distance between the lenticular lens assembly 301 and the display surface of the liquid crystal display unit 201 is denoted as Lcd, the distance between the light shielding surface of the mask 401 and the display surface of the liquid crystal display unit 201 is denoted as Lmd, the focal length of the lenticular lens assembly 301 in the vertical section is denoted as fc', the length of a longitudinal side of a pixel (the vertical pitch of a pixel) of the liquid crystal display unit 201 is denoted as Vd', the longitudinal length of a single cylindrical lens constituting the lenticular lens assembly 301 (the vertical pitch of the lenticular lens assembly 301) is denoted as Vc', and the length of a longitudinal side of each aperture (the vertical pitch of the apertures) of the mask 401 is denoted as Vmo'.

$$1/fc'=1/Lcd+1/Lmc \quad (1)'$$

$$Vd':Lcd=Vmo':Lmc \quad (2)'$$

$$2\times p\times Vd':Lmd=Vc':Lmc \quad (3)'\text{-}1$$

$$2\times Vm':Lmd=Vc':Lcd \quad (3)'\text{-}2$$

$$p\times Vd':Lcd=Vm':Lmc \quad (4)'$$

where expression (3)'-1 and expression (3)'-2 are dependent, and either one of them independently holds.

Figure 19:
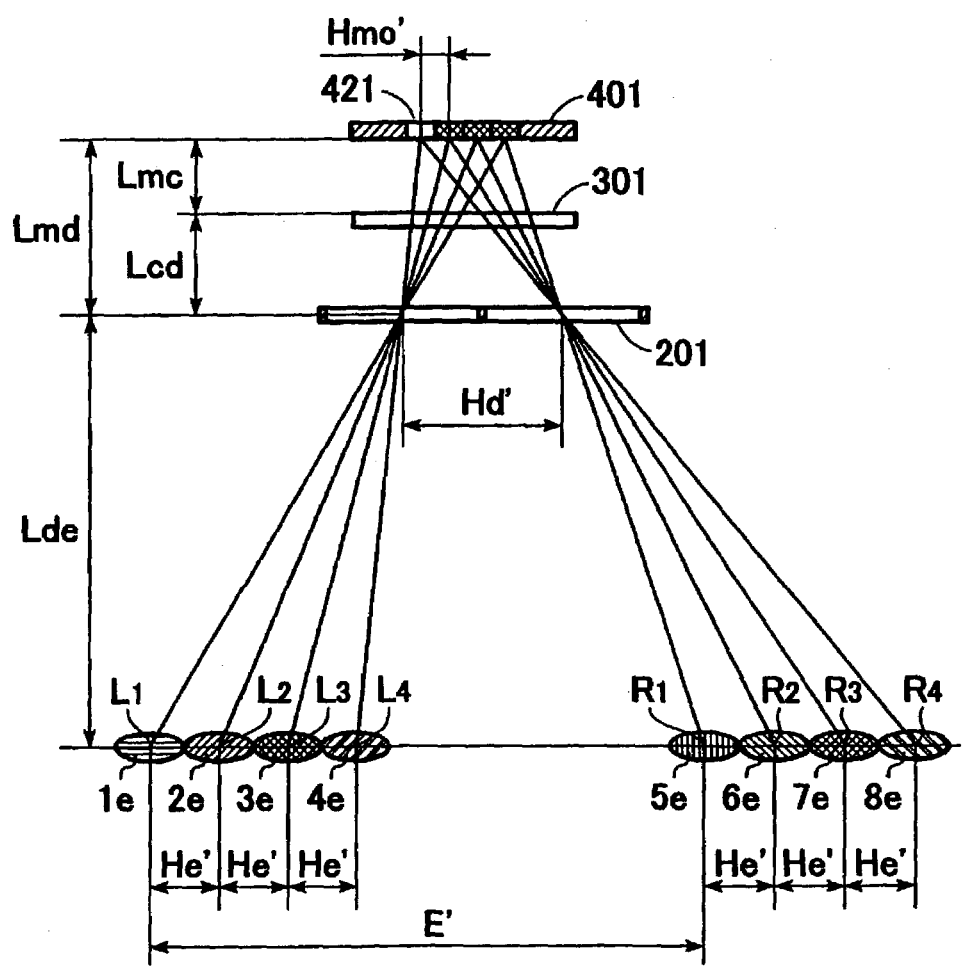
FIG. 19 is a sectional view taken at line A—A shown in FIG. 18.

FIG. 19 is a sectional view taken at line A—A shown in FIG. 18. The positions of the apertures 422, 423 and 424, which do not exist in the section shown in FIG. 19 are shown in terms of hatched areas.

Referring back to FIG. 18, the light fluxes of the backlight 700 passing through the aperture of a 4×n−3(th) line of the mask 401 are subjected to the action of the lenticular lens assembly 301 before they pass through the pixels 4 and 8 of a 4×n(th) line of the pixel blocks 220.

Referring to FIG. 19, the light fluxes from the pixel 4 reach a horizontal central point L4 in the left eye observation region that is located at a distance Lde from the mask 401, and the light fluxes from the pixel 8 reach a horizontal central point R4 in the right eye observation region that is located at a distance Lde from the mask 401. Thus, the light fluxes from all the pixels 4 on the liquid crystal display unit 201 illuminated by the light that has passed through the aperture of the 4×n−3(th) line of the mask 401 form a left eye strip-shaped observation subregion 4e having a width He, centering around the central point L4. Similarly, the light fluxes from the pixels 8 form a right eye strip-shaped observation subregion 8e having the width He, centering around the central point R4.

At this time, a positional relationship is established in which the horizontal centers of the pixels of the liquid crystal display unit 201, the horizontal centers of the apertures 421 of the mask 401, and the central points L4 and R4 of the observation regions are aligned.

The same relationship holds also in sections other than the section of the 4×n(th) line of the mask 401. More specifically, the horizontal centers of the pixels of the liquid crystal display unit 201, the horizontal centers of the apertures 422, 423 and 424 of the mask 401, and the horizontal central points L1, L2, L3, R1, R2 and R3 of the observation regions lie on straight lines.

The expressions shown below hold when the distance between the light shielding surface of the mask 401 and the display surface of the liquid crystal display unit 201 is denoted as Lmd, the distance from the display surface of the liquid crystal display unit 201 to an observation position is denoted as Lde, the center-to-center distance of laterally adjacent pixels (the horizontal pitch of a pixel) of the liquid crystal display unit 201 is denoted as Hd', the length of a lateral side of the mask block 420 of the mask 401 is denoted as Hm' (the horizontal pitch of the mask block 420), the horizontal center-to-center distance of the individual apertures 421, 422, 423 and 424 of the mask 401 is denoted as Hmo' (the horizontal pitch of the apertures), the horizontal pitch of the central points L1, L2, L3, L4 and R1, R2, R3, R4 is denoted as He', and the distance between the observation central points L1 and R1 is denoted as E (E being substantially equal to the distance between observer's eyes).

$$Lcd+Lmc=Lmd \qquad (5)'$$

$$Hd':Lmd=E:Lmd+Lde \qquad (6)'$$

$$2\times Hd':Lde=Hm':Lmd+Lde \qquad (7)'$$

$$Hmo':Lmd=He':Lde \qquad (8)'$$

(Horizontal Open Area Ratio of the Apertures)

Figure 20:
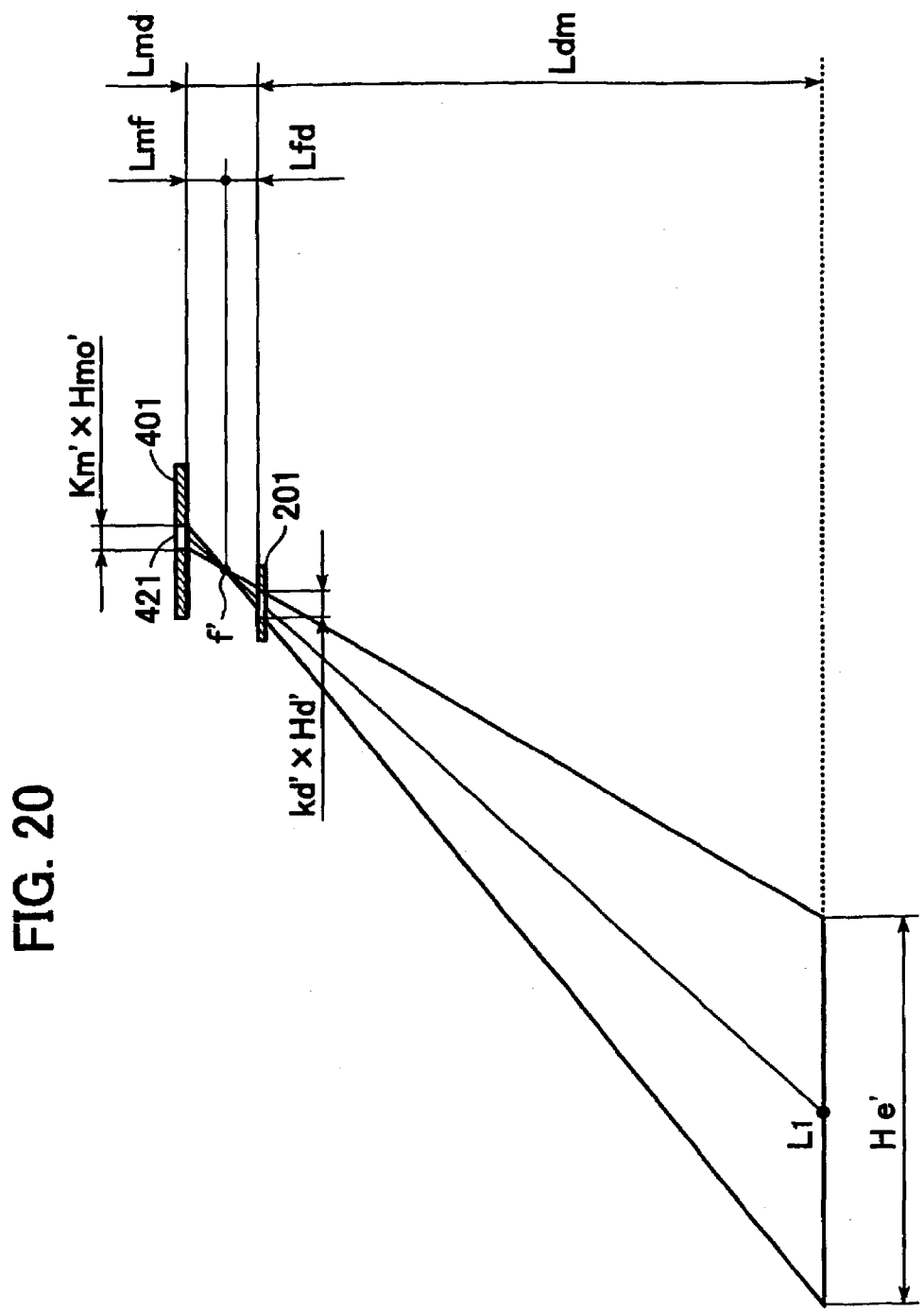
FIG. 20 is a sectional view showing the vicinity of left eye in the section taken at line A—A shown in FIG. 18.

FIG. 20 shows the section taken at line A—A shown in FIG. 18. In conjunction with this figure, the apertures of the pixels of the liquid crystal display unit 201 and the apertures of the mask 401 will be explained in detail.

In FIG. 20, kd' denotes the horizontal open area ratio of the aperture of a pixel of the liquid crystal display unit 201, and km' denotes the horizontal open area ratio of an aperture of the mask 401.

Based on the relationship illustrated in the figure, the horizontal distance of the aperture of a pixel of the liquid crystal display unit 201 is defined by kd'×Hd', and the horizontal distance of an aperture of the mask 401 is determined by km'×Hmo'.

As illustrated in the figure, the left end of the aperture of the mask 401, the right end of the aperture of the pixel of the liquid crystal display unit 201, and the right end of the left eye observation subregion 1e having the width He' and involving the observation central point L1 are on a straight line. Similarly, the right end of the aperture of the mask 401, the left end of the aperture of the pixel of the liquid crystal display unit 201, and the left end of the left eye observation subregion 1e having the width He' and involving the observation central point L1 are also on a straight line.

The expressions shown below hold when the intersection point of the above straight lines is denoted as f', the distance from the mask 401 to the intersection point f' is denoted as Lmf', and the distance from the intersection point f' to the liquid crystal display unit 201 is denoted as Lf'd.

$$Lmd=Lmf'+Lf'd \qquad (9)'$$

$$Kd'\times Hd':Lf'd=km'\times Hmo':Lmf' \qquad (10)'$$

$$Km'\times Hmo':Lmf'=He':Lde+Lf'd \qquad (11)'$$

As in the first embodiment, the restrictions on the apertures lower the utilization factor of light. On the other hand, whereas a typical stereoscopic display unit is adapted to emit light to regions that cannot be viewed by an observer, the present embodiment is adapted to direct light toward the eyes of an observer. This means that the embodiment allows the observer to fully observe displayed images despite the lower utilization factor of light.

(Region That Exists Between Right and Left Eyes and That the Light from Pixels Does Not Reach)

In this embodiment also, there is a region at the distance E−p×He' that is located between right and left eyes and that the light from the pixels of the liquid crystal display unit 201 does not reach, as in the case of the first embodiment.

The foregoing Hms' is expressed as shown below:

$$Hms'=Hm'-(p-1+km')\times Hmo'$$

In this embodiment, the stereoscopic image display apparatus 101 is constructed such that the foregoing conditional expressions (1)', (2)', (3)'-1, (3)'-2, (4)', (5)', (6)', (7)', (8)', (9)', (10)' and (11)' are satisfied.

Figure 21:
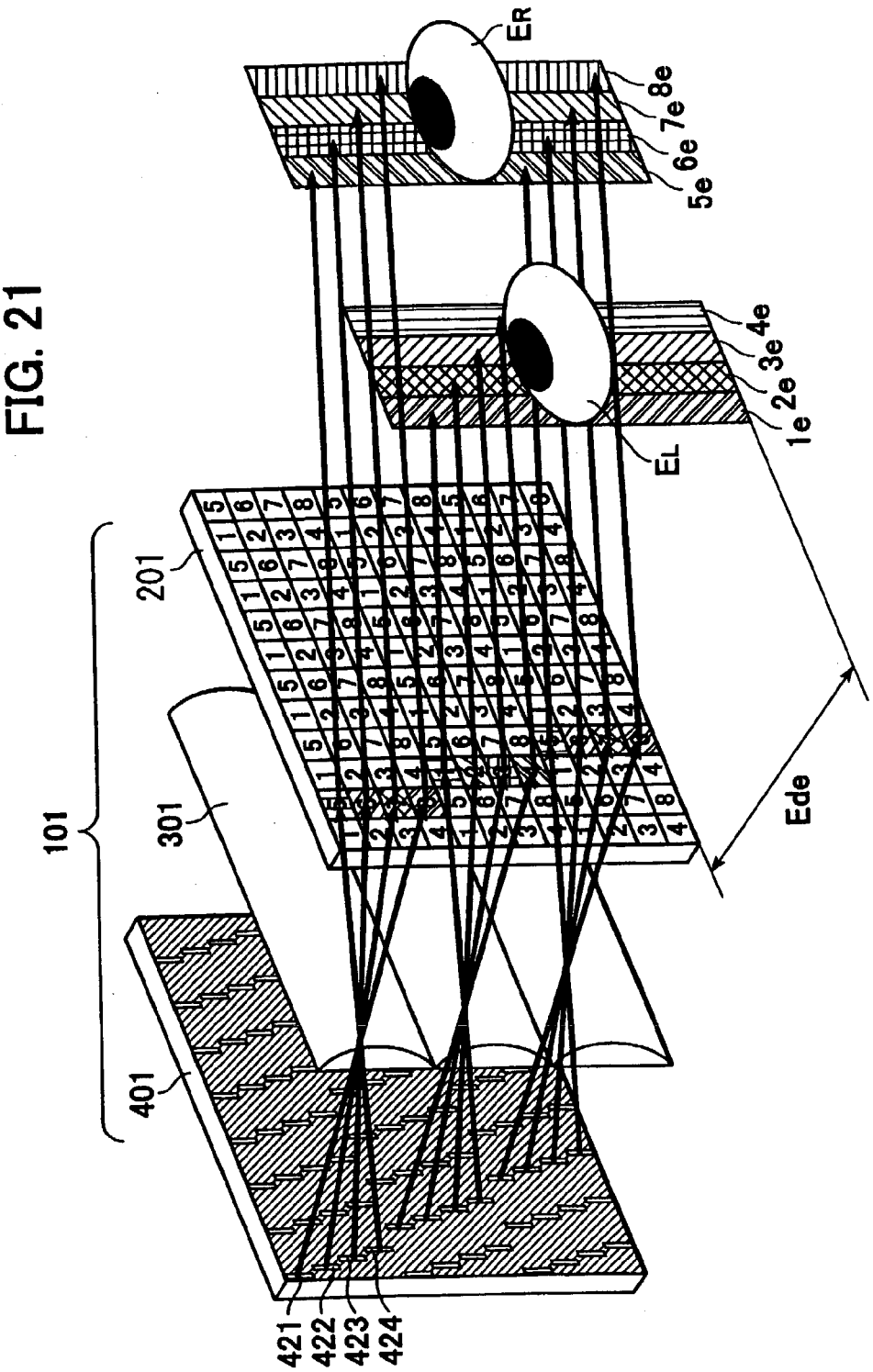
FIG. 21 is a perspective view illustrating the observation regions formed by the stereoscopic image display apparatus according to the second embodiment.

FIG. 21 shows the stereoscopic image display apparatus 101 constructed as described above.

Thus, the transmissive display device also makes it possible to form the left eye observation subregions 1e, 2e, 3e, 4e in the vicinity of the left eye EL of an observer, and the right eye observation subregions 5e, 6e, 7e, 8e in the vicinity of the right eye ER of the observer, and further to form, between the left eye EL and the right eye ER, the region where the light from the pixels does not reach.

Moreover, as shown in FIG. 21, the observation subregions 1e, 2e, 3e, 4e and 5e, 6e, 7e, 8e are adjacent to each other in the left eye observation region and the right eye observation region, respectively. Furthermore, intervals E (the intervals between the right and left observation central points) between paired left eye observation subregions and right eye observation subregions, namely, 1e and 5e, 2e and 6e, 3e and 7e, and 4e and 8e in the left eye observation region and the right eye observation region are equal in all paired observation subregions.

In other words, in the pixel block 220, the interval or the pixel pitch of the paired pixels for displaying paired parallax images that are disposed in, for example, the first and second columns of the first line is identical to the intervals of the paired pixels in the first and second columns of the second, third and fourth lines. The intervals of all paired pixels are set so that, as mentioned above, the intervals E between the left eye observation subregions and the right eye observation subregions that are paired between the left eye observation region and the right eye observation region are all the same.

Thus, in contrast to the prior art wherein the light from a display unit or pixels has been caused to also reach the region that cannot be viewed by an observer, namely, the region between the right and left eyes, the present embodiment is designed so that the light from a display unit is caused to reach only the vicinity of the right eye ER and the left eye EL of an observer, preventing the light from reaching the region between the right and left eyes. This allows the resolution of the liquid crystal display unit 201 to be efficiently utilized. Therefore, a stereoscopic image display apparatus with a higher resolution can be accomplished without the need for increasing the resolution of a display unit.

Moreover, the number of displayed images can be reduced, so that the capacity of an image data file can be reduced, permitting easier handling.

If a general-purpose display device is used for the display unit used in the first and second embodiments, then Hd and Hd' will be decided by the existing values of the devices used. Other parameters than Hd and Hd' need to be determined by designing.

Figure 23:
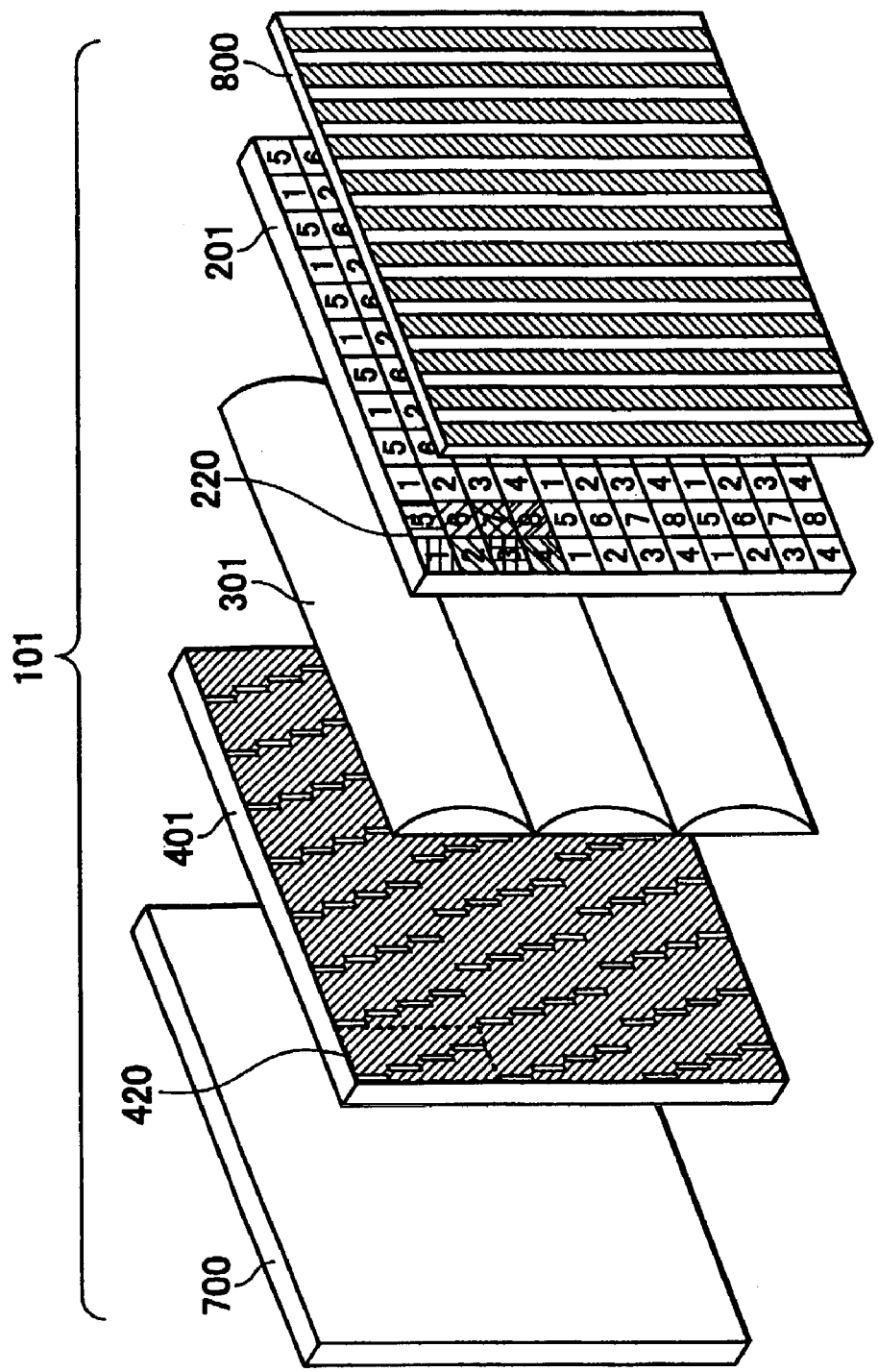
FIG. 23 is a perspective view showing the stereoscopic image display apparatus according to the second embodiment provided with the second mask for restricting the horizontal aperture ratio of the pixels of the display.
Figure 24:
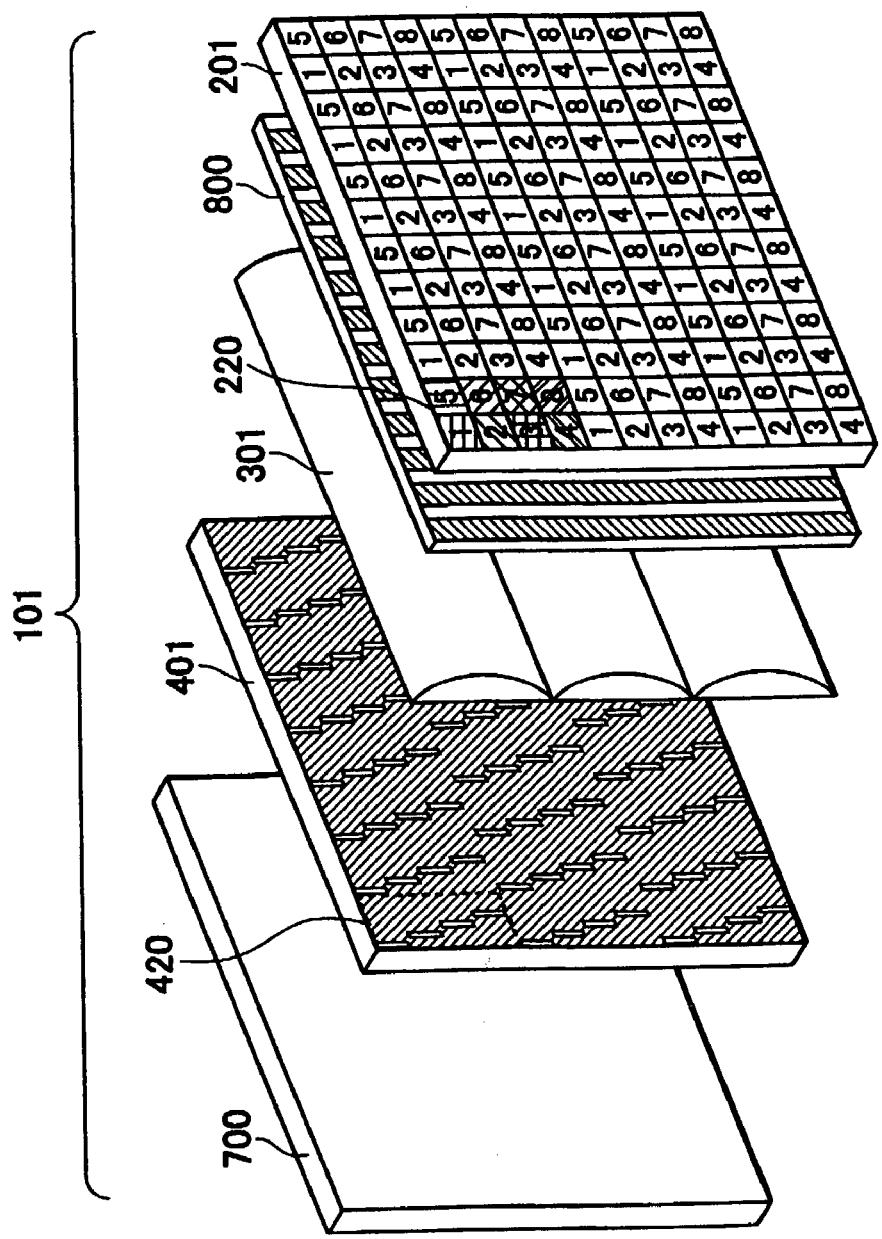
FIG. 24 is another perspective view showing the stereoscopic image display apparatus according to the second embodiment provided with the second mask for restricting the horizontal aperture ratio of the pixels of the display.

At this time, the horizontal open area ratio of the pixels of the general-purpose display device may not necessarily be a desired value. For this reason, a second mask 800 may preferably be provided that sets the horizontal open area ratio of the pixels of the display device to Kd and Kd', respectively, as shown in FIG. 22, FIG. 23 and FIG. 24.

Figure 22:
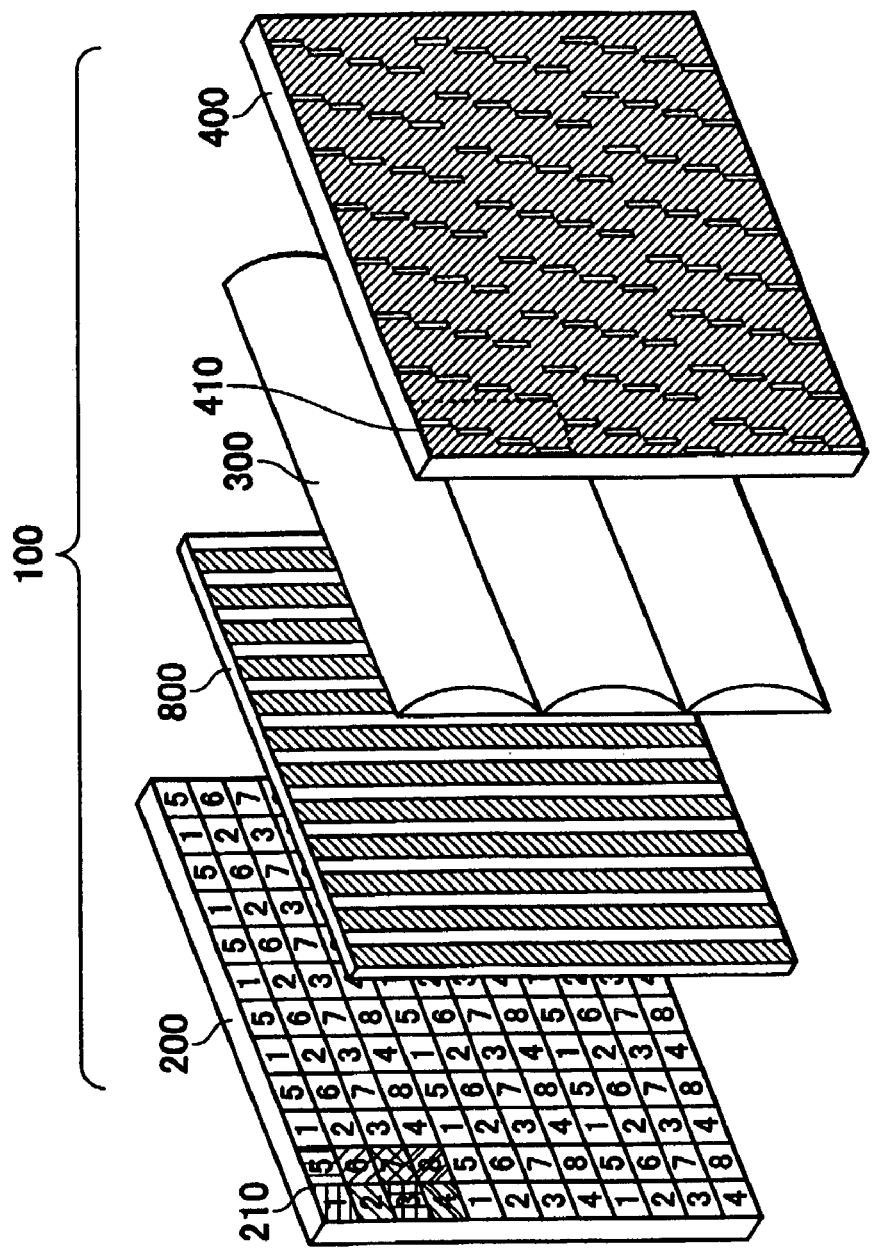
FIG. 22 is a perspective view showing the stereoscopic image display apparatus according to the first embodiment provided with a second mask for restricting the horizontal aperture ratio of the pixels of the display.

FIG. 22 shows an example wherein the second mask 800 has been provided on the display surface of the display unit 200 of the first embodiment. FIG. 23 shows an example wherein the second mask 800 has been provided on the display surface of the liquid crystal display unit 201 of the second embodiment. FIG. 24 shows an example wherein the second mask 800 has been provided on the rear surface of the liquid crystal display unit 201 of the second embodiment.

Thus, providing the second mask 800 makes it possible to construct a stereoscopic image display apparatus equivalent to those described in the first and second embodiments explained above, by using a general-purpose display device.

Third Embodiment

Figure 25:
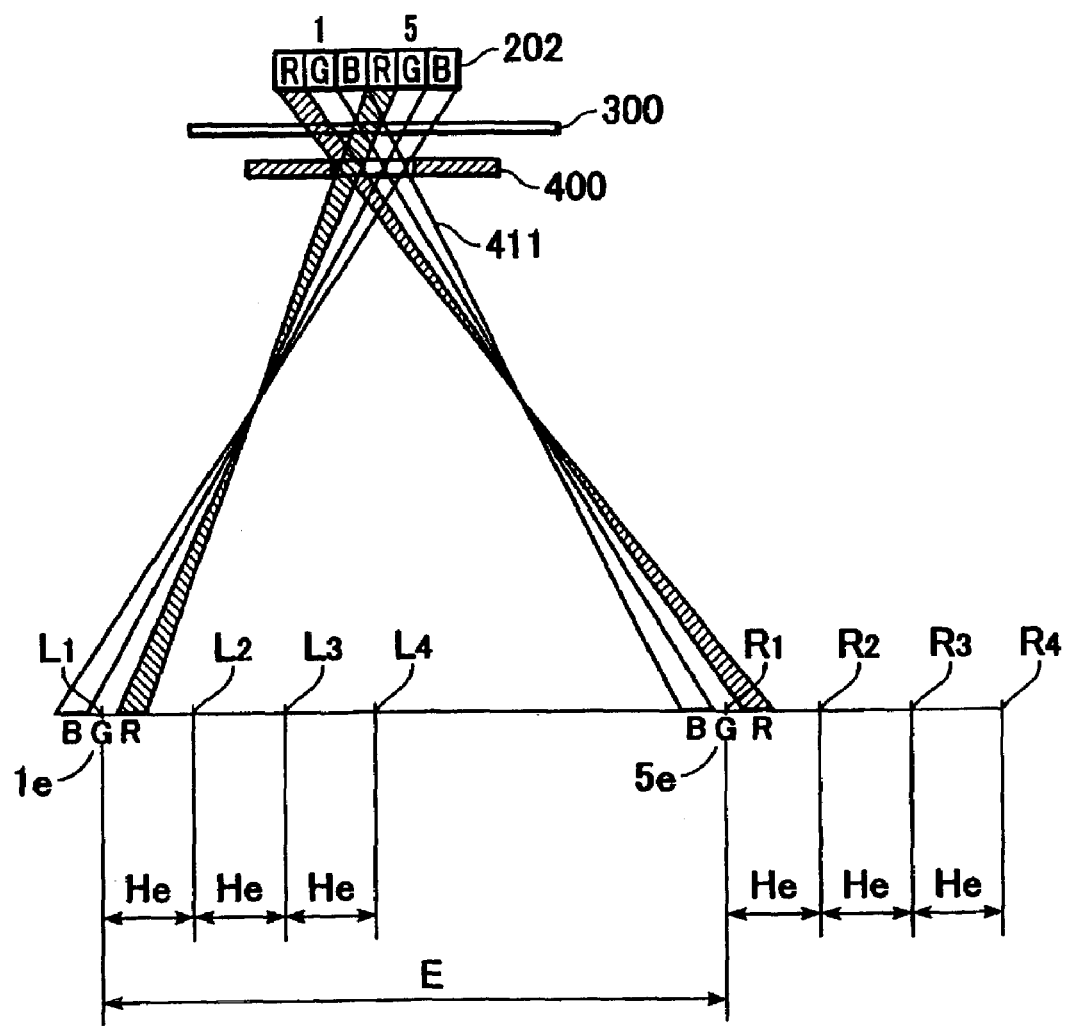
FIG. 25 is a view illustrating the principle of color separation at observation positions when a pixel in a display is formed using RBG sub-pixels.

FIG. 25 illustrates the principle of the color separation taking place at an observation position when each pixel of a display unit 202 is constructed of subpixels of three colors, namely, red (R), blue (B) and green (G), and causes images constituting parallax images to be displayed for each subpixel. FIG. 25 is a sectional view showing a pixel in a 4(=p)×n−3(th) line when each pixel of the display unit 202 is constructed of three subpixels.

Referring to FIG. 25, in the display unit 202, subpixels of R, B and G making up a pixel are laterally or horizontally arranged.

The light emitted from the subpixels constituting a pixel 1 and the subpixels constituting a pixel 5 of the display unit 202 is subjected to the action of a lenticular lens assembly 300, passes through an aperture 411 of a mask 400, and forms a left eye strip-shaped observation subregion 1e and right eye strip-shaped observation subregion 5e having a width of He in the vicinities of observation central points L1 and R1, respectively.

At this time, as illustrated, the images produced by the red subpixels R disposed at the left ends of the pixel 1 and the pixel 5 of the display unit 202 are formed at the right ends of the observation subregions 1e and 5e having the width He, as indicated by hatching in the figure.

Similarly, for the green subpixels G, the images are formed at the lateral centers of the observation subregions, and for the blue subpixels B, the images are formed at the left ends of the observation subregions.

The aforesaid relationship is applicable to pixels other than the pixels 1 and 5.

When an observer looks at the images, the R, G and B horizontally shift in the observation subregions, causing the observer to view them separately. This is known as color separation.

If a display unit adapted to form images on a display or screen having monochromic pixels in the first and second embodiments, then such color separation will not occur.

Figure 26:
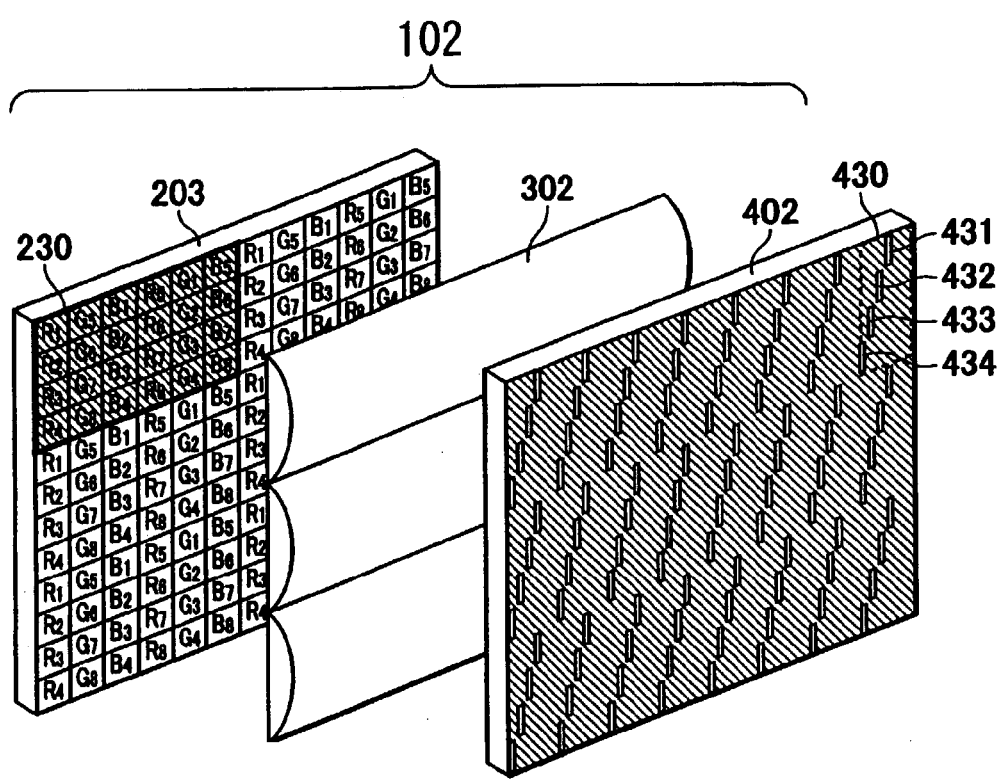
FIG. 26 is a perspective view showing the construction of a stereoscopic image display apparatus according to a third embodiment of the present invention.

FIG. 26 shows a construction of a stereoscopic image display apparatus according to the third embodiment of the present invention. This embodiment is designed to restrain the occurrence of the color separation at an observation position mentioned above.

(Three-Dimensional Image Display Apparatus 102)

Referring to FIG. 26, the stereoscopic image display apparatus 102 is constructed of a display unit 203, a lenticular lens assembly 302 and a mask 402. The lenticular lens assembly 302 and the mask 402 are equivalent to the lenticular lens assembly 300 and the mask 400 described previously.

(Display 203)

The display unit 203 is constructed of a display device having pixels arranged in a matrix pattern, each pixel being formed of subpixels of three colors, R, G and B. The display unit 203 is typically constructed of, for example, a liquid crystal display device, a plasma display device, an organic EL display device or a projector.

Referring to FIG. 26, in the display unit 203, the R, B and G subpixels constituting one pixel are arranged in a lateral or horizontal direction with an interval equivalent to one subpixel provided therebetween. These subpixels and the subpixels constituting one pixel (e.g., a pixel 5) paired with the above pixel (e.g., a pixel 1) are alternately arranged in the horizontal direction.

If the number of the pairs of parallax images that can be observed in the observation region is denoted as 2p, then a total of 2×p×3 subpixels is arranged one by one as the pixels displaying substantially the same parts in the images of 2×p×3 images on the display unit 203. The 2×p×3 subpixels are arranged in a predetermined order in the p-line, 2×3-column matrix pattern to form a pixel block 230. A plurality of the pixel blocks 230 is arranged in a matrix pattern. A composite parallax image created by combining parallax images of the quantity that permits observation is displayed on the display unit 203.

The hatched region on the display unit 203 shown in FIG. 26 indicates one pixel block 230. This embodiment shows the arrays of pixels (subpixels) when the number of the pairs of parallax images is set to p(=4)×3=12 and the total number of images is set to 2p×3=24.

In FIG. 26, numerals 1 to 8 assigned to the RGB subpixels shown on the pixel block 230 denote the subpixels for displaying first to fourth right eye images observed by the right eye of an observer in a right eye observation region and fifth to eighth left eye images observed by the left eye of the observer.

In each pixel block 230, subpixels of the same color are vertically arranged, forming vertical stripe subpixels arrays in which subpixels of different colors are horizontally arranged in stripes.

More specifically, in the pixel block 230, the R subpixels for displaying images 1, 2, 3 and 4 are vertically arranged in this order in the first column, the G subpixels for displaying images 5, 6, 7 and 8 are vertically arranged in this order in the second column, and the B subpixels for displaying the images 1, 2, 3 and 4 are vertically arranged in this order in the third column. Furthermore, the R subpixels for displaying the images 5, 6, 7 and 8 are vertically arranged in this order in the fourth column, the G subpixels for displaying the images 1, 2, 3 and 4 are vertically arranged in this order in the fifth column, and the B subpixels for displaying the images 5, 6, 7 and 8 are vertically arranged in this order in the sixth column.

In the pixel block 230, the interval between paired subpixels (subpixel pitch) for displaying paired parallax images disposed that are disposed in, for example, the first, third and fifth columns, and the second, fourth and sixth columns in the first line is the same as the intervals between paired subpixels in the first, third and fifth columns, and the second, fourth and sixth columns in the second, third and fourth lines. As it will be discussed hereinafter, the intervals between paired subpixels are set such that the intervals E between the left eye observation subregion and right eye observation subregion that are paired between the left eye observation region and the right eye observation region are the same in all paired observation subregions.

(Mask 402)

Referring to FIG. 26, the mask 402 is constructed of a light shielding member that includes a plurality of mask blocks 430 arranged in a matrix pattern, each mask block 430 having four (=p) apertures 431, 432, 433 and 434. The vertical width of the mask block 430 is denoted as Vm", while the horizontal width thereof is denoted as Hm".

The four apertures 431, 432, 433 and 434 in the mask block 430 are arranged such that they are vertically adjacent and horizontally shifted from each other. Each mask block 430 is provided with a light shielding portion (Hms in the first embodiment) which vertically extends and in which the four apertures 431, 432, 433 and 434 are absent. This light shielding portion prevents the light from the groups of pixels from the display unit 203 from reaching the region between the right and left observation regions, as it will be discussed hereinafter.

(Forming Multi-View Observation Region Arrays)

Figure 27:
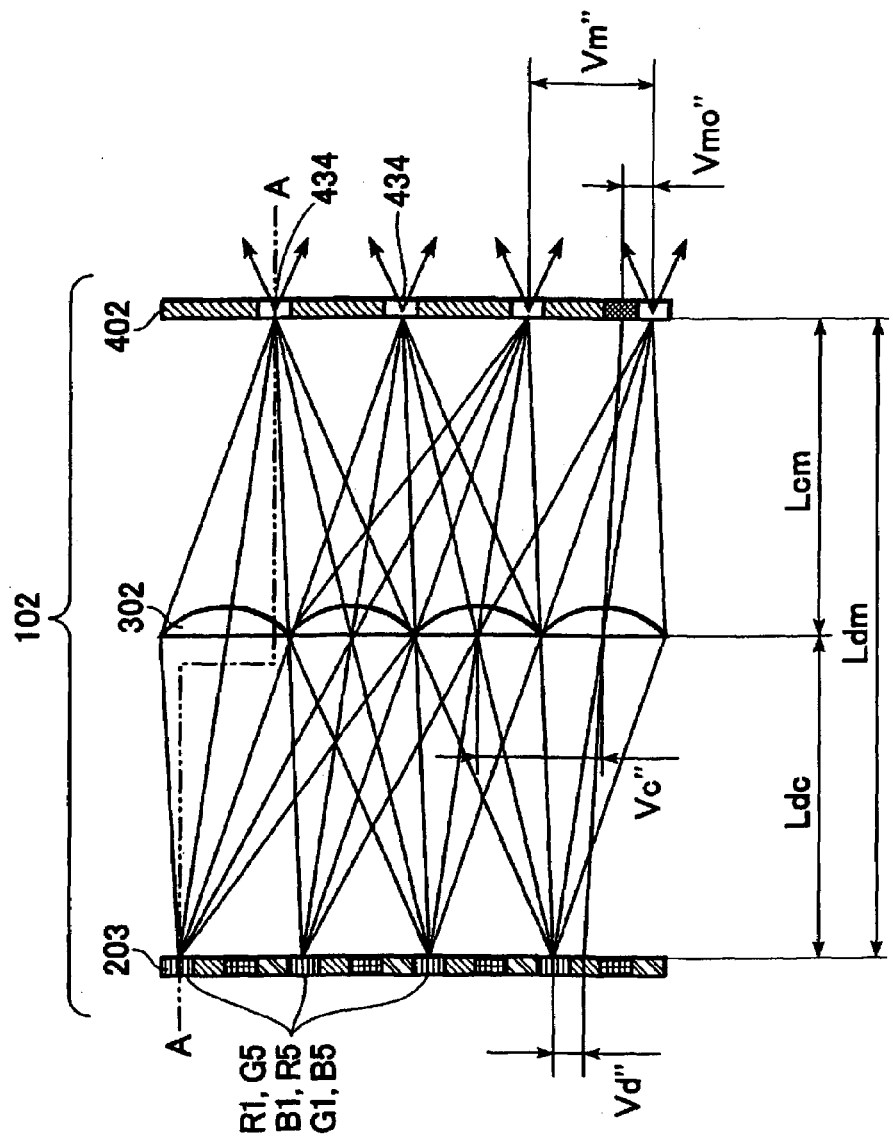
FIG. 27 is a vertical sectional view showing the construction of the stereoscopic image display apparatus according to the third embodiment.

FIG. 27 is a vertical sectional view of the aperture 434 in the 4(=p)×n(th) line (n being an integer of 1 or more) of the mask block 430.

The light fluxes from subpixels R1, G5, B1, R5, G1 and B5 of the first line in the pixel block 230 on the display unit 203 are substantially condensed at the 4×n(th) lines of the mask 402, and pass through the apertures 434. After passing through the apertures of the mask 402, the light fluxes advance, vertically diverging.

At this time, the vertical centers of the subpixels of the display unit 203, the vertical centers of the cylindrical lenses of the lenticular lens assembly 302, and the vertical centers of the apertures 434 of the mask 402 lie on straight lines. Furthermore, in the vertical plane, the cylindrical lenses of the lenticular lens assembly 302 establish an optically conjugating positional relationship between the display surface of the display unit 203 and the light shielding surface of the mask 402.

As in the case of the first embodiment, the same relationship holds also in vertical sections other than the vertical section of the 4×n(th) line of the mask 402. More specifically, the vertical centers of the subpixels of the display unit 203, the vertical centers of the cylindrical lenses of the lenticular lens assembly 302, and the vertical centers of the apertures 431, 432 and 433 of the mask 402 lie on straight lines.

The expressions shown below hold when the distance between the display surface of the display unit 203 and the lenticular lens assembly 302 is denoted as Ldc, the distance between the lenticular lens assembly 302 and the light shielding surface of the mask 402 is denoted as Lcm, the distance between the display surface of the display unit 203 and the light shielding surface of the mask 402 is denoted as Ldm, the focal length in the lenticular lens assembly 302 in the vertical section is denoted as fc", the length of a longitudinal side of a subpixel (the vertical pitch of a subpixel) of the display unit 203 is denoted as Vd", the longitudinal length of a single cylindrical lens constituting the lenticular lens assembly 302 (the vertical pitch of the lenticular lens assembly 302) is denoted as Vc", and the length of a longitudinal side of each aperture (the vertical pitch of the apertures) of the mask 402 is denoted as Vmo".

$$1/fc''=1/Ldc+1/Lcm \qquad (1)''$$

$$Vd'':Ldc=Vmo'':Lcm \qquad (2)''$$

$$2\times p\times Vd'':Ldm=Vc'':Lcm \qquad (3)''\text{-}1$$

$$2\times Vm'':Ldm=Vc'':Ldc \qquad (3)''\text{-}2$$

$$p\times Vd'':Ldc=Vm'':Lcm \qquad (4)''$$

where expression (3)"-1 and (3)"-2 are dependent, and either one of them independently holds.

Figure 28:
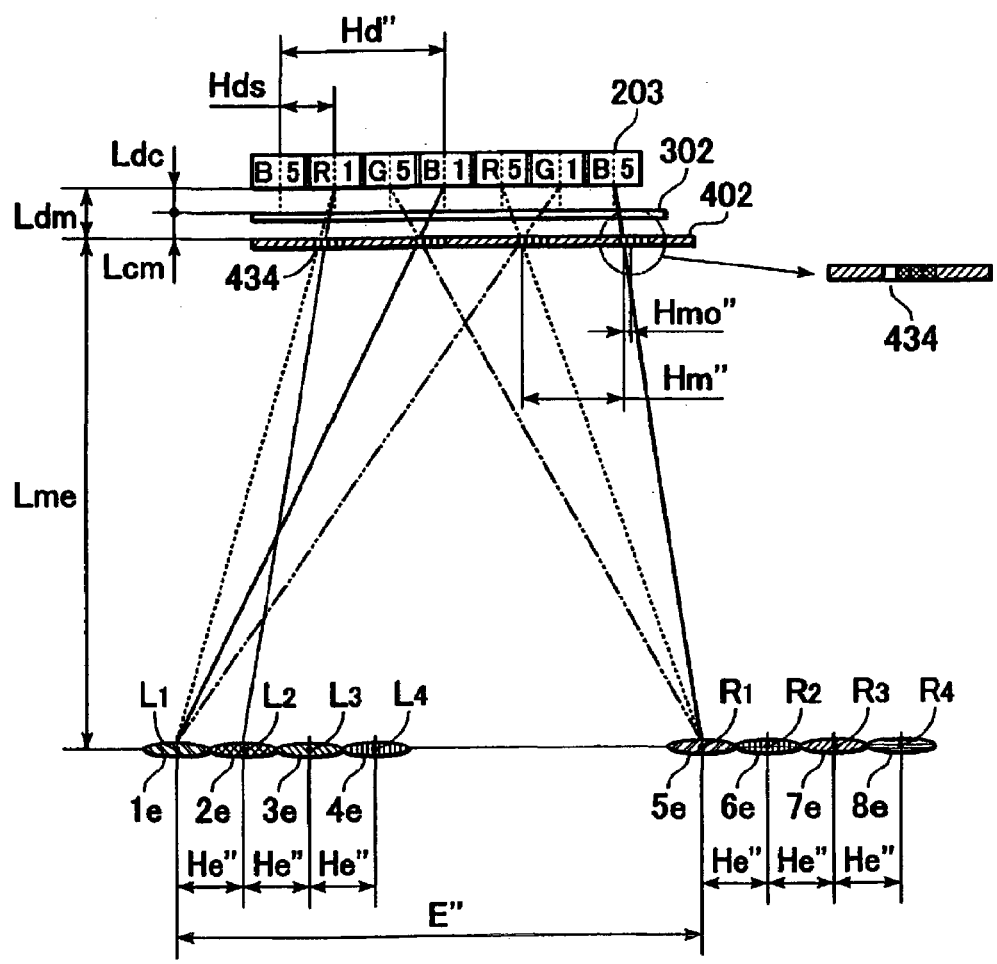
FIG. 28 is a sectional view taken at line A—A shown in FIG. 27.

FIG. 28 is a sectional view taken at line A—A shown in FIG. 27. The positions of the apertures 431, 432 and 433 that do not exist in the section shown in FIG. 28 are indicated in terms of hatched areas.

The light fluxes from the subpixels R1, R5, B1, B5, G1 and G5 of the first line in each pixel block 230 on the display unit 203 pass through the apertures 434 of the fourth line (4×n(th) line in the entire mask 402) of the mask blocks 430 of the mask 402. The light fluxes from the subpixels R1, B1 and G1 reach a left eye observation central position L1 at a distance Lme from the mask 402, and the light fluxes from the subpixels G5, R5 and B5 reach a right eye observation central position R1 at a distance Lme from the mask 402.

Thus, the light fluxes from all the subpixels R1, B1 and G1 on the display unit 203 pass through the apertures 434 of the mask 402 and form a left eye strip-shaped observation subregion 1e having a width He" around an observation central position L1. Similarly, the light fluxes from the subpixels G5, R5 and B5 form the right eye strip-shaped observation subregion 5e having the width He" around an observation central position R1.

At this time, a positional relationship is established in which the horizontal centers of the subpixels of the display unit 203, the horizontal centers of the apertures 434 of the mask 402, and the observation central points L1 and R1 lie on straight lines, respectively.

Referring to FIG. 28, the light fluxes emitted from the R subpixels are indicated by dotted lines, the light fluxes emitted from the G subpixels are indicated by chain lines, and the light fluxes emitted from the B subpixels are indicated by solid lines. As may be seen from the figure, the light emitted from the pixel blocks 230 converges into R, G and B light fluxes, one each, at the observation central positions L1 and R1.

In other words, according to the present embodiment, the R, G and B are mixed at the observation central positions L1 and R1, and no color separation takes place.

As in the first embodiment, the same relationship applies also in sections other than at the 4×n(th) line of the mask 402. The horizontal centers of the subpixels of the display unit 203, the horizontal centers of the apertures 431, 432 and 433 of the mask 402, and the central positions L2 to L4 and R2 to R4 of the observation subregions 2e to 4e and 6e to 8e lie on straight lines, and no color separation takes place.

The expressions shown below hold when the distance between the display surface of the display unit 203 and the light shielding surface of the mask 402 is denoted as Ldm, the distance from the light shielding surface of the mask 402 to an observation position is denoted as Lme, the center-to-center distance of laterally adjacent pixels (the horizontal pitch of a pixel) of the display unit 203 is denoted as Hd", the center-to-center distance of laterally adjacent subpixels (the horizontal pitch of a pixel) of the display unit 203 is denoted as Hds, the length of a lateral side of the mask block 430 (the horizontal pitch of the mask block 430) of the mask 402 is denoted as Hm", the horizontal center-to-center distance of the individual apertures 431, 432, 433 and 434 (the horizontal pitch of the apertures) of the mask 402 is denoted as Hmo", the horizontal pitch of the observation central positions L1 to L4 and R1 to R4 is denoted as He", and the distance between the observation central positions L1 and R1 is denoted as E (E being substantially equal to the distance between observer's eyes).

$$Ldc+Lcm=Ldm \qquad (5)''$$

$$Hds:Ldm=E:Lme \qquad (6)''$$

$$2\times Hds:Ldm+Lme=Hm'':Lme \qquad (7)''$$

$$Hmo'':Ldm=He'':Ldm+Lme \qquad (8)''$$

$$3\times Hds=Hd'' \qquad (12)$$

Figure 29:
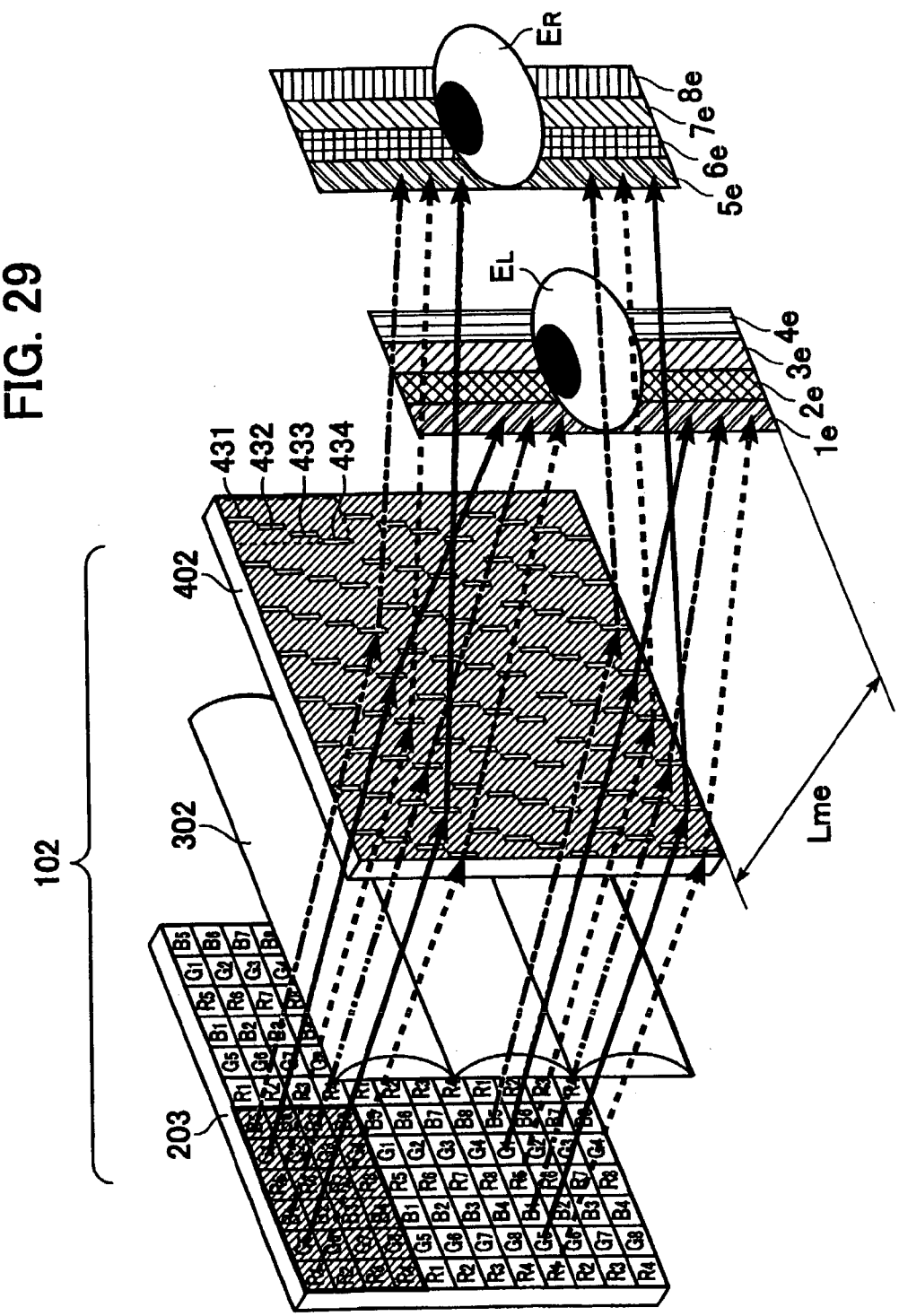
FIG. 29 is a perspective view illustrating observation regions formed by the stereoscopic image display apparatus according to the third embodiment.

Referring to FIG. 29, the light fluxes radially emitted from the subpixels on the display unit 203 of a stereoscopic image display apparatus 102 are subjected to the vertical lens action through the lenticular lens assembly 302, and formed into directive light fluxes directed toward left eye EL and right eye ER of an observer through the mask 402. These light fluxes form left eye observation subregions 1e, 2e, 3e, 4e in the vicinity of the left eye EL and right eye observation subregions 5e, 6e, 7e, 8e in the vicinity of the right eye ER at a distance Lme from the mask 402. In the observation subregions 1e to 8e, substantially the same number of color light fluxes from the R, G and B subpixels are mixed, and no color separation occurs.

(Horizontal Open Area Ratio of the Apertures)

Figure 30:
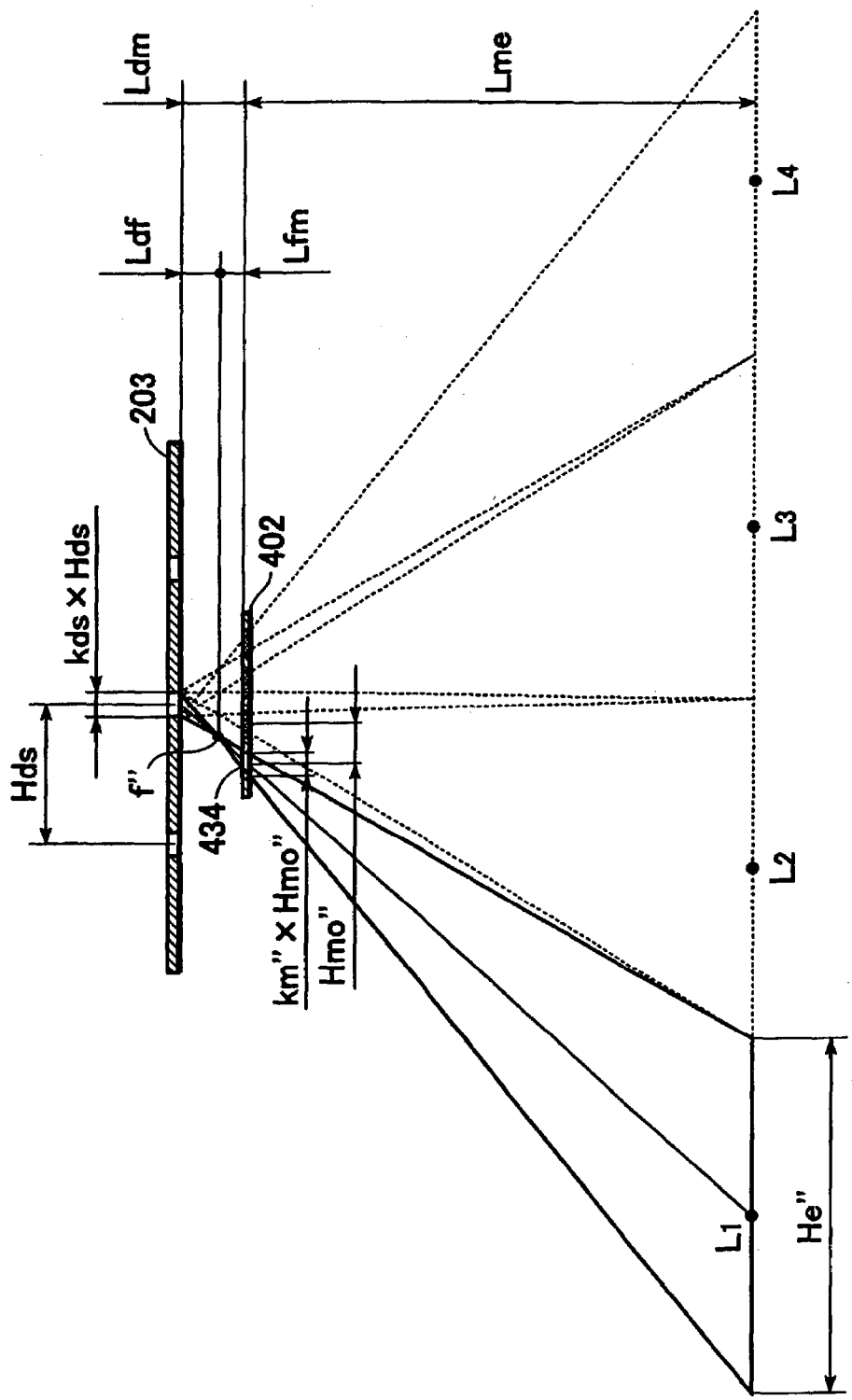
FIG. 30 is a sectional view showing the vicinity of left eye in the section taken at line A—A shown in FIG. 27.

FIG. 30 shows a horizontal section taken at line A—A shown in FIG. 27. FIG. 30 illustrates the details of the relationship between the apertures of the pixels of the display unit 203 and the apertures of the mask 402 in the vicinity of the left eye EL of an observer. The positions of the apertures 431, 432 and 433 that do not exist in the section shown in FIG. 30 are indicated by hatching.

In FIG. 30, kds denotes the horizontal open area ratio of the aperture of a subpixel of the display unit 203, and km" denotes the horizontal open area ratio of an aperture of the mask 402. Thus, the horizontal width of the aperture of the subpixel of the display unit 203 is denoted by kds×Hds, and the horizontal width of an aperture of the mask 402 is denoted by km"×Hmo".

As illustrated in the figure, the left end of the aperture of the subpixel of the display unit 203, the right end of the aperture of the mask 402, and the right end of the left eye observation subregion 1e having the width He" around the observation central point L1 are on a straight line. Similarly, the right end of the aperture of the subpixel of the display unit 203, the left end of the aperture of the mask 402, and the left end of the left eye observation subregion 1e having the width He" around the observation central point L1 are also on a straight line.

The expressions shown below hold when the intersection point of the above straight lines is denoted as f", the distance from the display unit 203 to the intersection point f" is denoted as Ldf", and the distance from the intersection point f" to the mask 402 is denoted as Lf"m.

$$Ldm = Ldf'' + Lf''m \qquad (9)''$$

$$kds \times Hds : Ldf'' = km'' \times Hmo'' : Lf''m \qquad (10)''$$

$$kds \times Hds : Ldf'' = He'' : Lme + Lf''m \qquad (11)''$$

As in the first embodiment, the restrictions on the apertures lower the utilization factor of light. On the other hand, whereas a typical stereoscopic display unit is adapted to emit light to regions that cannot be viewed by an observer, the present embodiment is adapted to direct light toward the eyes of an observer. This means that the embodiment enables the observer to fully observe displayed images despite the lower utilization factor of light.

(Region That Exists Between Right and Left Eyes and That the Light from Pixels Does Not Reach)

In this embodiment also, there is a region at the distance E−p×He" that is located between right and left eyes and that the light from the pixels or subpixels of the display unit 203 does not reach. The foregoing Hms" is expressed as shown below:

$$Hms'' = Hm'' - (p - 1 + km'') \times Hmo''$$

In this embodiment, the stereoscopic image display apparatus 102 is constructed such that the foregoing conditional expressions (1)", (2)", (3)"-1, (3)"-2, (4)", (5)", (6)", (7)", (8)", (9)", (10)", (11)" and (12) are satisfied.

Thus, the stereoscopic image display apparatus 102 having the construction described above forms the left eye observation subregions 1e, 2e, 3e, 4e in the vicinity of the left eye EL of an observer, and the right eye observation subregions 5e, 6e, 7e, 8e in the vicinity of the right eye ER of the observer, and also forms the region where the light from the subpixels of the display unit 203 does not reach at a location between the left eye observation subregions 1e, 2e, 3e, 4e and the right eye observation subregions 5e, 6e, 7e, 8e.

Thus, in contrast to the prior art wherein parallax images have been formed also in the region that cannot be viewed by an observer, the present embodiment is designed so that parallax images are formed only in the vicinities of the right eye ER and the left eye EL of an observer. This allows the resolution of the display unit 203 to be efficiently utilized. Therefore, a stereoscopic image display apparatus with a higher resolution can be accomplished.

Moreover, the number of displayed parallax images can be reduced, so that the capacity of an image data file can be reduced, permitting easier handling.

According to the present embodiment, no color separation will occur even when a display unit constructed of R, G and B subpixels in vertical stripes is used.

In the present embodiment, the descriptions have been given of the type of the display unit 203 having its components disposed on the display surface side. Alternatively, however, a transmissive display device may be used, as in the second embodiment.

Figure 31:
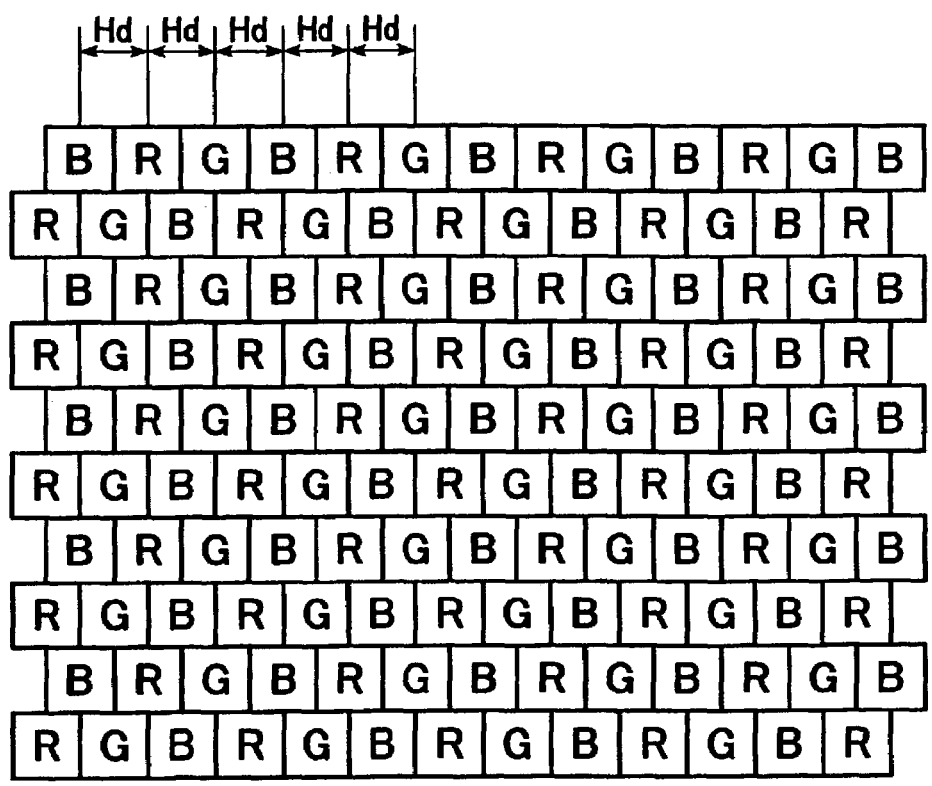
FIG. 31 is a front view showing the construction of another display used with the stereoscopic image display apparatus according to the third embodiment.

According to the present invention, it is also possible to use a display unit in which subpixels are regularly arranged at an equal pitch Hd in a horizontal line to arrange the R, G and B subpixels in a triangular pattern, known as a "delta arrangement," as shown in FIG. 31.

Fourth Embodiment

FIG. 32 shows a construction of a stereoscopic image display apparatus 103, which is a fourth embodiment in accordance with the present invention. In this embodiment, the components having the same functions as those of the first and second embodiments will be assigned the same reference numerals of the corresponding components in the first and second embodiments.

In the stereoscopic image display apparatuses according to the first to third embodiments, the regions where right and left parallax images or stereoscopic images can be satisfactorily observed are fixed. This embodiment is adapted such that, if an observer changes his or her observation position (X0, Z0) in the horizontal direction, e.g., from X0 to X1, then the position of an observation region is changed accordingly.

Figures 33A, 33B:
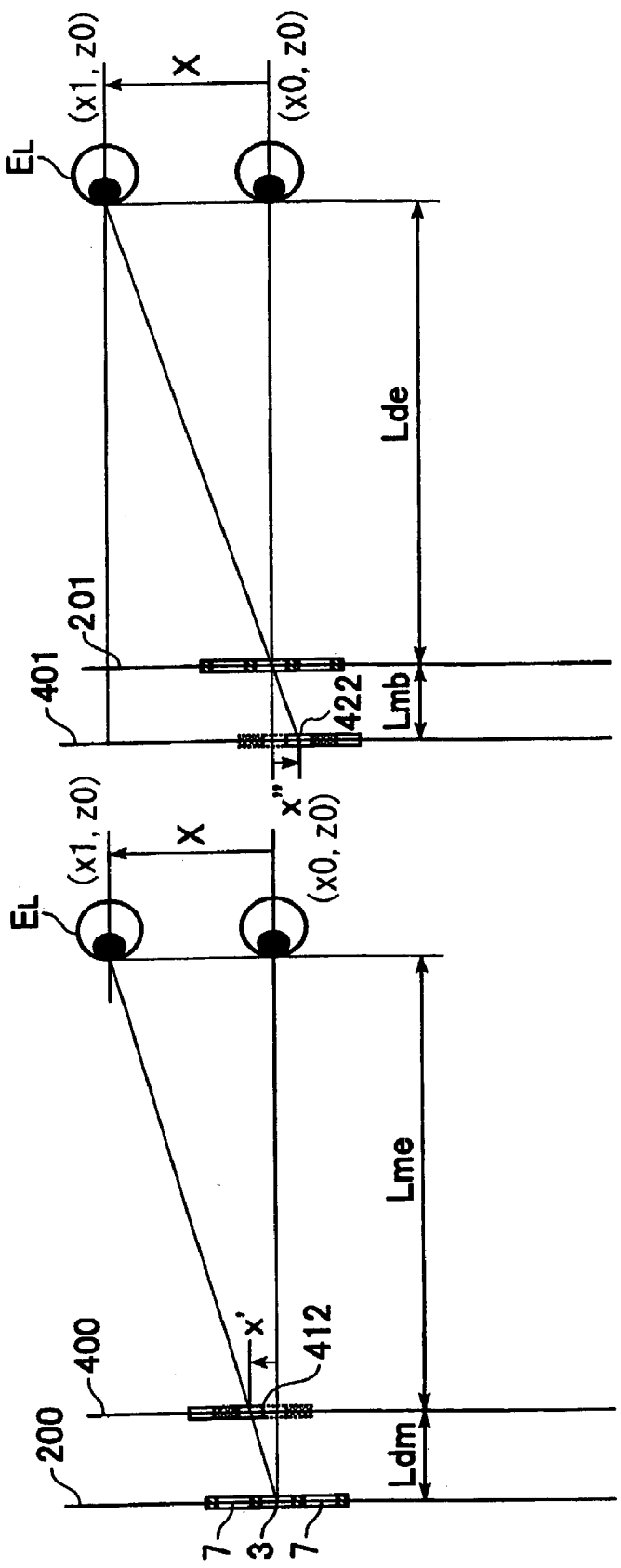
FIG. 33 is a view illustrating the observation regions, which shift to follow changes in the position of an observer, in the stereoscopic image display apparatus according to the fourth embodiment.

The principle based on which the position of an observation region is shifted as the position of an observer changes in the horizontal direction will be described in conjunction with FIG. 33A. In this case, the left eye EL of the observer is moved by distance X in the direction of an arrow in the figure. FIG. 33A is a sectional view taken at a horizontal plane involving a pixel 3 (and a pixel 7) of a stereoscopic image display apparatus having the same basic construction as that described in conjunction with the first embodiment.

As explained in the first embodiment, for the light from the pixel 3 of the display unit 200 to reach the left eye EL, the conditions of the positional relationship in which the horizontal center of the pixel 3, the horizontal center of the aperture 412 of the mask 400, and the left eye EL lie on a straight line are to be satisfied.

When the left eye EL moves by the distance X in the direction of the arrow (the horizontal direction) in the figure, the mask 400 is moved by a distance x' in the same direction as that in which the observer has moved, as shown in FIG. 33A, in order to satisfy the aforesaid positional conditions. Hence, based on the geometric relationship shown in FIG. 33A, the shifting distance x' of the mask 400 is to satisfy the relationship defined by the expression given below:

$$X:(Lme+Ldm)=x':Ldm$$

Thus, when the observer moves by the distance X in the horizontal direction, the stereoscopic observation region can be shifted to follow changes in the position of the observer by moving the mask 400 by the distance x' in the same direction in which the observer has moved.

In FIG. 33A, the mask 400 is moved; alternatively, however, the display unit 200 may be moved in the opposite direction from the direction in which the observer has moved by a distance x'd to satisfy the following expression:

$$X:Lme=x'd:Ldm$$

Further, the mask 400 may be formed of a transmissive liquid crystal device or the like that permits changes of the arrangement or mask pattern of the apertures and a light shielding area, so that the mask pattern is changed as an observer moves.

FIG. 33B is a sectional view taken at a horizontal plane involving the pixel 3 (and the pixel 7) of a stereoscopic image display apparatus having the same basic construction as that described in conjunction with the second embodiment. As explained in the second embodiment, for the light from the pixel 3 of the liquid crystal display unit 201 to reach the left eye EL, the conditions of the positional relationship in which the horizontal center of the pixel 3 of the liquid crystal display unit 201, the horizontal center of the aperture 422 of the mask 401, and the left eye EL lie on a straight line are to be satisfied.

When the left eye EL moves by the distance X in the direction of the arrow (the horizontal direction) in the figure, the mask 401 is moved by a distance x" in the direction opposite from that in which the observer has moved, as shown in FIG. 33B, in order to satisfy the aforesaid positional conditions. Hence, based on the geometric relationship shown in FIG. 33B, the shifting distance x" of the mask 401 is set to satisfy the relationship defined by the expression given below:

$$X:Lde=x":Lmd$$

Thus, when the observer moves by the distance X in the horizontal direction, the position of the stereoscopic observation region can be shifted to follow changes in the position of the observer by moving the mask 401 by the distance x" in the direction opposite from the direction in which the observer has moved.

In FIG. 33B, the mask 401 is moved; alternatively, however, the liquid crystal display unit 201 may be moved in the same direction in which the observer has moved by a distance x"d to satisfy the following expression:

$$X:(Lme+Ldm)=x"d:Ldm$$

Fifth Embodiment

FIG. 34 shows a construction of a stereoscopic image display apparatus, which is a fifth embodiment in accordance with the present invention. In this embodiment, the components having the same functions as those of the first and second embodiments will be assigned the same reference numerals of the corresponding components in the first and second embodiments.

In the stereoscopic image display apparatuses according to the first to third embodiments, the regions where right and left parallax images or stereoscopic images can be satisfactorily observed are fixed. This embodiment is adapted such that, if an observer changes his or her observation position (X0, Z0) in the anteroposterial direction, e.g., from Z0 to Z1, then the position of an observation region is changed accordingly.

Figure 34A:
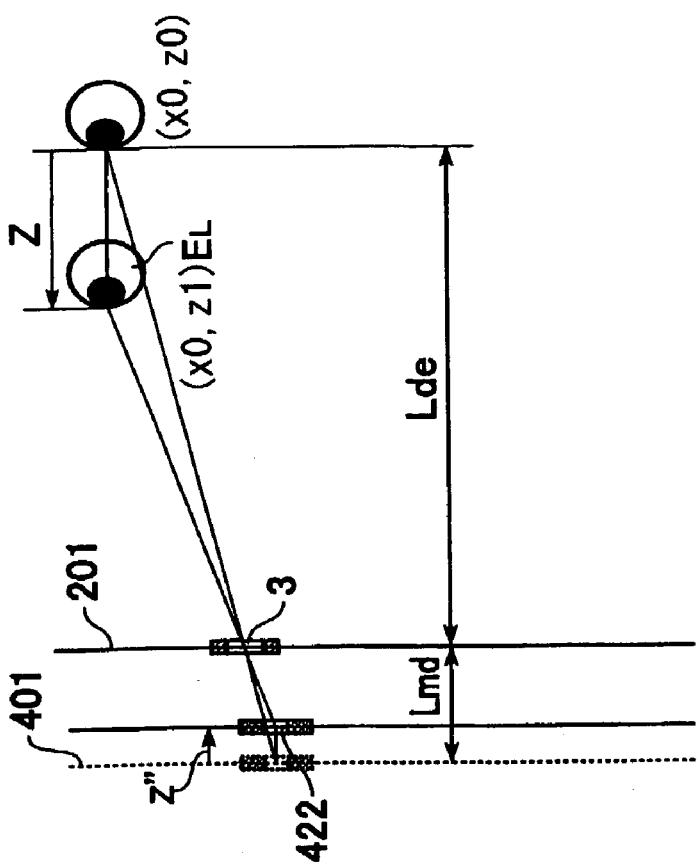
FIG. 34 is a view illustrating the observation regions, which shift to follow changes in the position of an observer, in a stereoscopic image display apparatus according to a fifth embodiment of the present invention.

The principle based on which the position of an observation region is shifted as the position of an observer changes in the anteroposterior direction will be described in conjunction with FIG. 34A. In this case, the left eye EL of the observer is moved by distance Z in the direction of an arrow in the figure. FIG. 34A is a sectional view taken at a horizontal plane involving a pixel 3 of a stereoscopic image display apparatus having the same basic construction as that described in conjunction with the first embodiment.

As explained in the first embodiment, for the light from the pixel 3 of the display unit 200 to reach the left eye EL, the conditions of the positional relationship in which the horizontal center of the pixel 3, the horizontal center of the aperture 412 of the mask 400, and the left eye EL lie on a straight line are to be satisfied.

When the left eye EL moves by the distance Z in the direction of the arrow (the anteroposterior direction) in the figure, the mask 400 is moved by a distance z' in the same direction as that in which the observer has moved, as shown in FIG. 34A, in order to satisfy the aforesaid positional conditions.

Hence, based on the geometric relationship shown in FIG. 34A, the shifting distance z' of the mask 400 is set to satisfy the relationship defined by the expression given below:

$$z':Z=Ldm:Ldm+Lme$$

Thus, when the observer moves by the distance Z in the anteroposterior direction, the position of the stereoscopic observation region can be shifted to follow changes in the position of the observer by moving the mask 400 by the distance z' in the same direction in which the observer has moved.

In FIG. 34A, the mask 400 is moved; alternatively, however, the display unit 200 may be moved in the opposite direction from the direction in which the observer has moved by a distance z'd to satisfy the following expression:

$$z'd:Z=Ldm:Lme$$

Figure 34B:
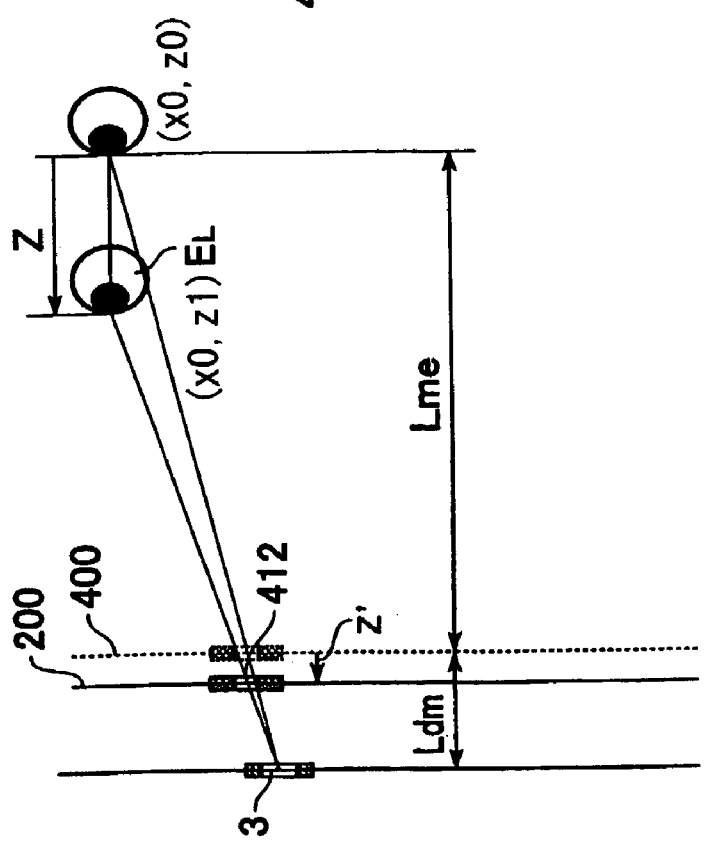

FIG. 34B is a sectional view taken at a horizontal plane involving the pixel 3 of a stereoscopic image display apparatus having the same basic construction as that described in conjunction with the second embodiment. As explained in the second embodiment, for the light from the pixel 3 of the liquid crystal display unit 201 to reach the left eye EL, the conditions of the positional relationship in which the horizontal center of the pixel 3 of the liquid crystal display unit 201, the horizontal center of the aperture 422 of the mask 401, and the left eye EL lie on a straight line are to be satisfied.

When the left eye EL moves by the distance Z in the direction of the arrow (the anteroposterial direction) in the figure, the mask 401 is moved by a distance z" in the direction opposite from that in which the observer has moved, as shown in FIG. 34B, in order to satisfy the aforesaid positional conditions. Hence, based on the geometric relationship shown in FIG. 34B, the shifting distance z" of the mask 401 is set to satisfy the relationship defined by the expression given below:

$$z":Z=Lmd:Lde$$

Thus, when the observer moves by the distance Z in the anteroposterial direction, the position of the stereoscopic observation region can be shifted to follow changes in the position of the observer by moving the mask 401 by the distance z" in the direction opposite from the direction in which the observer has moved.

In FIG. 34B, the mask 401 is moved; alternatively, however, the liquid crystal display unit 201 may be moved in the same direction in which the observer has moved by a distance z"d to satisfy the following expression:

$$z"d:Z=Lmd:Lmd+Lde$$

Figure 35:
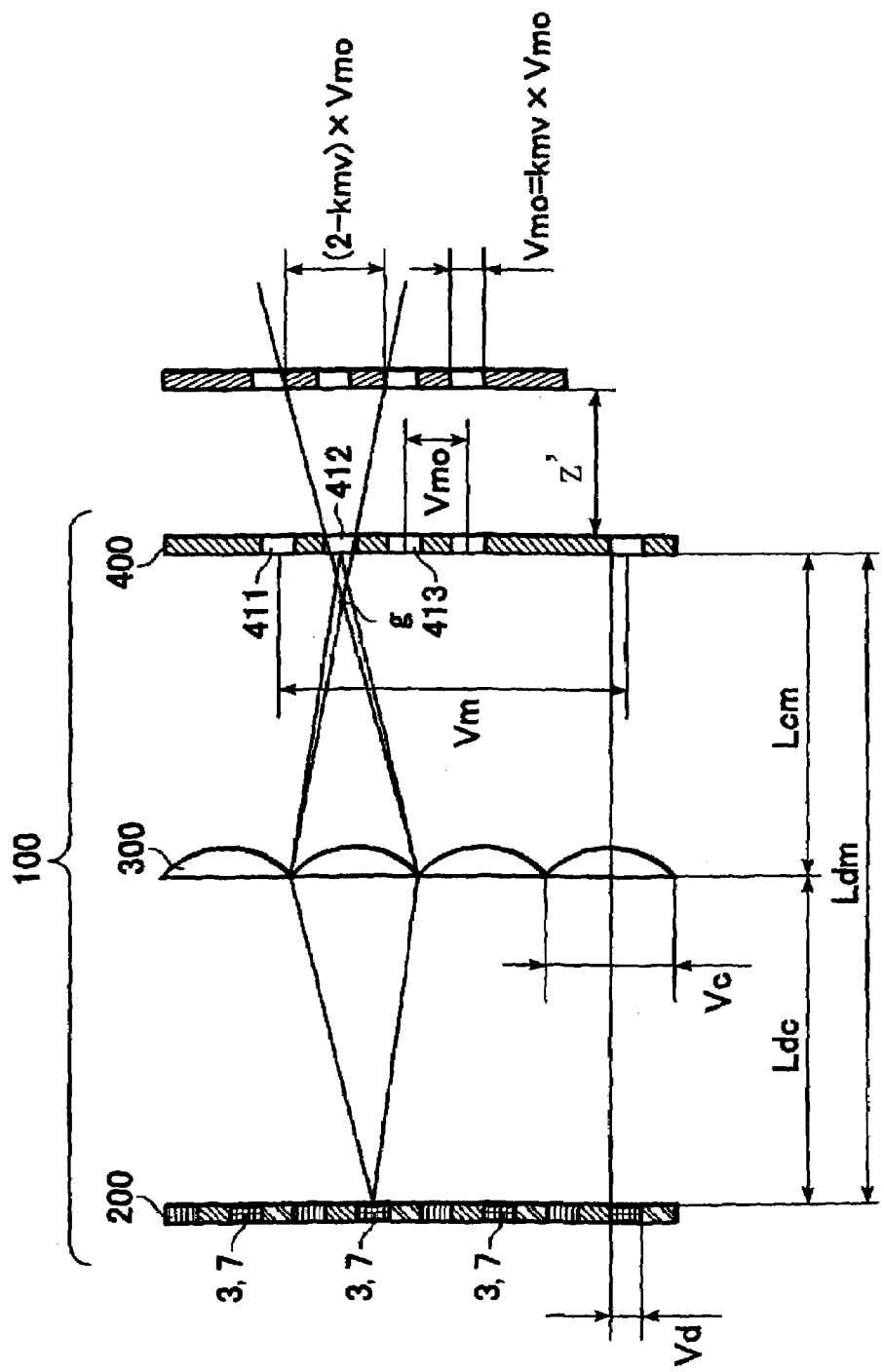
FIG. 35 is a vertical sectional view showing a relationship between the fourth and fifth embodiments and lenticular lenses.

FIG. 35 illustrates the relationship between the changes in the vertical position and the image formation of the lenticular lens assembly 300. In the figure, kmv denotes the vertical open area ratio of the mask 400.

A positional change of the mask 400 disturbs the optical conjugating relationship between the mask 400 and the display unit 200. At this time, there should be no problem as long as the light emitted from the upper end of a cylindrical lens of the lenticular lens assembly 300 in the figure does not hit the upper end of the aperture 413 located below the aperture 412 of the mask 400.

Similarly, there should be no problem as long as the light emitted from the lower end of the cylindrical lens does not hit the lower end of the aperture 411 located above the aperture 412 of the mask 400.

Based on the geometric relationship shown in FIG. 35, the relationship shown by the expression given below is established when the intersection point of the above two light fluxes is denoted as g, the moving distance of the mask 400 is denoted as z', the distance between the lenticular lens assembly 300 and the light shielding surface of the mask 400 is denoted as Lcm, the distance between the lenticular lens assembly 300 and the intersection point g of the light fluxes is denoted as Lcg, the distance between the intersection point g of the light fluxes and the light shielding surface of the mask 400 is denoted as Lgm, the longitudinal length of each of the cylindrical lenses making up the lenticular lens assembly 300 (the vertical pitch of the lenticular lens assembly 300) is denoted as Vc, and the vertical pitch of the aperture of the mask 400 is denoted as Vmo.

$$Vc:Lcg=kmv \times Vmo:Lgm=(2-kmv) \times Vmo:Lgm+z' \quad (13)$$

Therefore, the mask 400 may be moved for a distance smaller than z' that satisfies the above condition. The same applies to the case of z" described above.

The construction explained in the fourth and fifth embodiments is especially advantageous when the width He of the observation subregion discussed in conjunction with FIG. 16 is set to be smaller than the half of D0, which is the diameter of an observer's pupil.

For instance, when a stereoscopic image display apparatus is constructed by setting D0>He and D0=4 mm, light will be incident to form two or more images in one eye of an observer. Under such a condition, unlike the both-eye par- allax system using two parallax images, there is an advantage in that the convergence and accommodation of eyes will virtually match.

To construct a stereoscopic image display apparatus according to a prior art, parallax images must be formed in a range larger than the distance between the eyes of an observer. If the range is, for example, 70 mm, then He<2 mm, so that 35 pairs of parallax images are required, while the observation region is restricted to the range of 70 mm at the same time.

The stereoscopic image display apparatuses according to the embodiments require only three images per eye, that is, a total of six images for both eyes. Moreover, the position of the observation area is changed so as to follow a change in an observation position, providing a wider observable range. In addition, switching the images displayed on the basis of observation positions so as to display the images captured substantially at observation positions makes it possible to represent smooth motion parallaxes with parallax images of He<2 mm.

Sixth Embodiment

Figure 36:
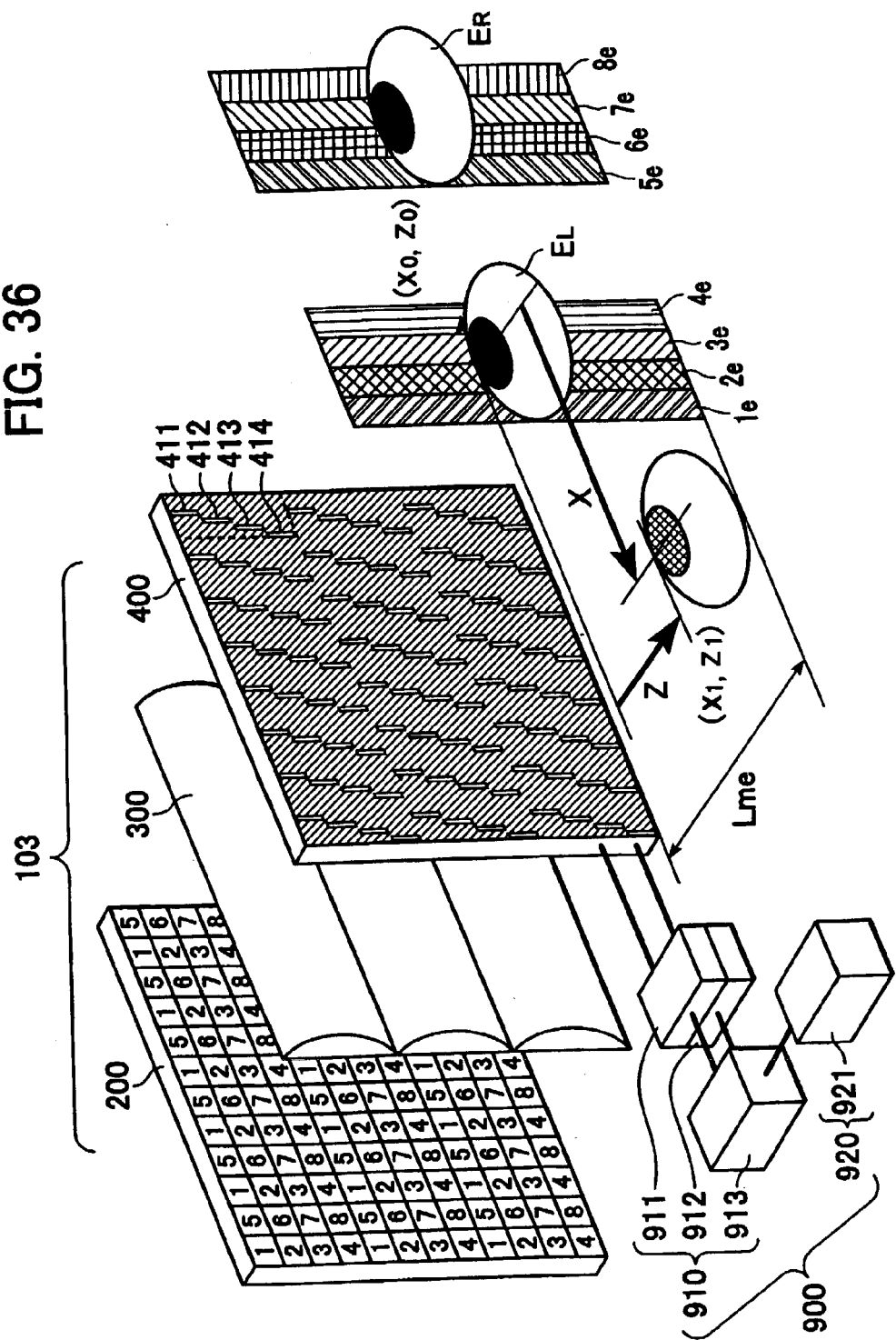
FIG. 36 is a perspective view showing the construction of a stereoscopic image display apparatus according to a sixth embodiment of the present invention.

FIG. 36 shows a construction of a stereoscopic image display apparatus, which is a sixth embodiment of the present invention. The stereoscopic image display apparatus is equipped with a device for shifting an observation region, following up changes in the position of an observer (hereinafter referred to as "the observation region follow-up device") 900 described in the foregoing fourth and fifth embodiments.

The basic construction of the stereoscopic image display apparatus is the same as that of the first embodiment, and the same components will be assigned the same reference numerals as those in the first embodiment.

The observation region follow-up device 900 is constructed of a driving unit 910 for driving a mask 400 and an observer position input unit 920 for inputting the positions of observer's eyes.

(Driving Unit 910)

The driving unit 910 is constructed of an X-direction driver 911 for driving the mask 400 in the X-direction (the horizontal direction) in the figure, a Z-direction driver 912 for driving the mask 400 in the Z-direction (the anteroposterial direction) in the figure, and a controller 913 for controlling the drivers 911 and 912. The observer position input unit 920 is connected to the controller 913.

(Controller 913)

The controller 913 constructed primarily of a personal computer calculates the distances of movement of an observer in the X-direction and the Z-direction on the basis of a coordinate value of the position of an observer that is detected by the observer position input unit 920, and drives the mask 400 in the X-direction and Z-direction.

(Observer Position Input Unit 920)

The observer position input unit 920 has a position detection sensor 921 for detecting the positions of observer's eyes in terms of a space coordinate value. Various methods may be used for detecting the horizontal and anteroposterial positions of an observer by the observer position input unit 920.

For instance, an image of an observer may be taken by a TV camera functioning as a sensor, and the image is processed to determine the central position of the observer's face. As a method for detecting the anteroposterial position of the observer, a known auto-focus method used with a camera or the like, or a stereo camera method may be used.

In such a construction, the controller 913 calculates the distance X of movement of an observer in the X-direction and the distance Z thereof in the Z-direction on the basis of a change in the coordinate value of the position of the observer that is detected by the position detecting sensor 921. Thus, a moving amount x' in the X-direction and a moving amount z' in the Z-direction are calculated to move the mask 400 on the basis of the calculation results.

Then, the controller 913 controls the drivers 911 and 912 to move the mask 400 by the distance x' in the lateral direction and by the distance z' in the anteroposterial direction.

Thus, the stereoscopic image display apparatus can be achieved that enables an observer to view good stereoscopic images regardless of the position of the observer by shifting the position of the observation region by automatically moving the mask 400 in the X-direction and the Z-direction, following up the movement of the observer.

In this embodiment, the descriptions have been given of the case where, as the position of an observer changes, the position of the observation region is shifted by moving the mask 400 in the X-direction and the Z-direction. Alternatively, however, the display unit 200 may be moved in the X-direction and the Z-direction, as described in the fourth and fifth embodiments. Further, the mask 400 may be moved in the X-direction, while moving the display unit 200 in the Z-direction, or the display unit 200 may be moved in the X-direction, while moving the mask 400 in the Z-direction.

It is also possible to apply the same construction to the stereoscopic image display apparatus, which uses the transmissive display device described in the second embodiment, to accomplish a stereoscopic image display apparatus that allows good stereoscopic images to be observed independently of the position of an observer by automatically adjusting the position of the observation region in response to the movement of the observer.

Similarly, even when the mask 400 is constructed of a component, such as a transmissive liquid crystal device, that permits the arrangement of apertures and light shielding areas (mask pattern) to be changed, the stereoscopic image display apparatus may be accomplished that allows good stereoscopic images to be observed independently of the position of an observer by changing the mask pattern in response to the movement of the observer.

Seventh Embodiment

Figure 37:
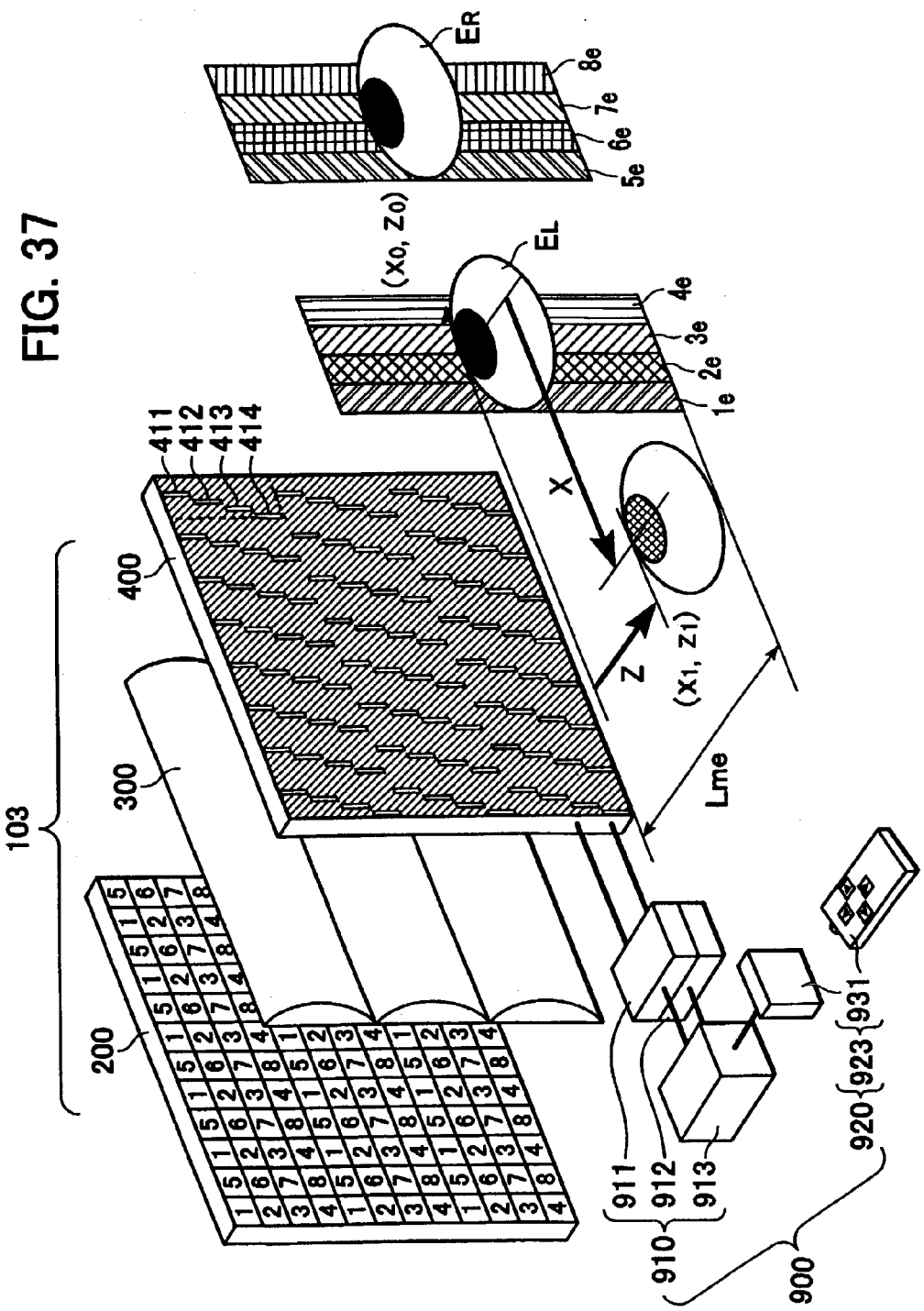
FIG. 37 is a perspective view showing the construction of a stereoscopic image display apparatus according to a seventh embodiment of the present invention.

FIG. 37 shows an example wherein an observation position setting switch 923 through which an observer enters his or her observation position is used in place of the observer position input unit 920 that uses the position detection sensor 921 in the sixth embodiment discussed above.

Figure 38:
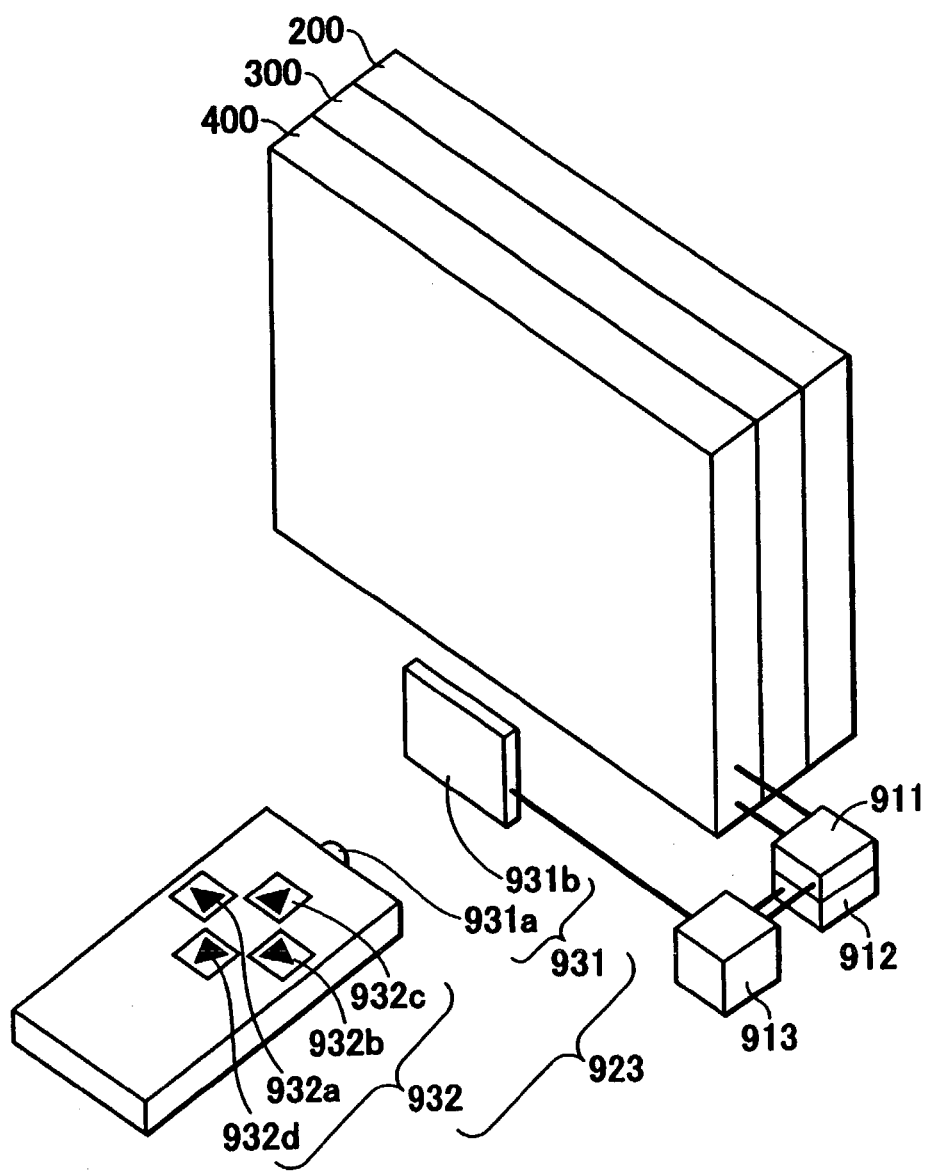
FIG. 38 is a perspective view showing the construction of a mechanism interlocked with observation regions in the stereoscopic image display apparatus according to the seventh embodiment.

FIG. 38 shows an example of the observation position setting switch 923. The observation position setting switch 923 is constructed of an infrared wireless switch 931 equipped with an infrared projector 931a and an infrared photoreceiver 931b.

The observation position setting switch 923 is provided with an observation position input keypad 932. When the input keypad 932 is operated by an observer, the infrared projector 931a emits light, and the infrared light is received by the infrared photoreceiver 931b.

The keypad 932 includes a leftward key 932a operated when a current observation position is shifted to the left, a rightward key 932b operated when the position is shifted to the right, a forward key 932c operated when the position is shifted forward, and a backward key 932d operated when the position is shifted backward.

The output signals issued in response to the inputs supplied by operating the keys of the observation position setting switch 923 are transmitted to the controller 913. The controller 913 moves the mask 400 by controlling the drivers 911 and 912 to set the observation region to the position desired by an observer.

Thus, in contrast to the prior art in which the light (image light) from the pixels of a display unit reaches the region between the right and left eyes of an observer so as to form parallax images, the embodiments described above are adapted to cause image light to reach only the vicinities of the right eye ER and the left eye EL, permitting efficient use of the resolution, i.e., pixels, of a display unit used. This makes it possible to accomplish a stereoscopic image display apparatus exhibiting a higher resolution without the need for increasing the resolution of the display unit. Moreover, the number of images shown on the display unit can be reduced, so that the capacity of an image data file can be reduced, permitting easier handling.

Shifting the position of an observation region whenever the observation position of an observer is changed allows the observation region to be expanded. Good stereoscopic images can be observed in the region regardless of the position of an observer.

Similarly, even when the mask 400 is constructed of a component, such as a transmissive liquid crystal device, that permits the arrangement of apertures and light shielding areas (mask pattern) to be changed, the stereoscopic image display apparatus may be accomplished that allows good stereoscopic images to be observed independently of the position of an observer by changing the mask pattern in response to the movement of the observer.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A stereoscopic image display apparatus which displays a plurality of stereoscopic images including a first stereoscopic image and a second stereoscopic image different from the first stereoscopic image on an observation plane, the stereoscopic image display apparatus comprising:

a display including,
a plurality of first right eye pixels which display a first right eye image corresponding to the first stereoscopic image,
a plurality of first left eye pixels which display a first left eye image corresponding to the first stereoscopic image and having parallax with respect to the first right eye image,
a plurality of second right eye pixels which display a second right eye image corresponding to the second stereoscopic image, and
a plurality of second left eye pixels which display a second left eye image corresponding to the second stereoscopic image and having parallax with respect to the second right eye image;
a masking member; and a lenticular lens array which is provided between the display and the masking member and includes a plurality of lenses with optical power in the vertical direction, the lenses extending in the horizontal direction and arranged along vertical direction;

wherein the first right eye pixels are adjacent to the first left eye pixels in the horizontal direction and are adjacent to the second right eye pixels in the vertical direction, and the second left eye pixels are adjacent to the second right eye pixels in the horizontal direction and are adjacent to the first left eye pixels in the vertical direction, and wherein, through the masking member and the lenticular lens array, the first right eye image and the second right eye image are displayed on different regions in a right eye observation region of the observation plane, and the first left eye image and the second left eye image are displayed on different regions in a left eye observation region of the observation plane, and wherein a region where image light from the first right eye pixels, the second right eye pixels, the first left eye pixels and the second left eye pixels do not reach exists between the right eye observation region and the left eye observation region, and wherein the masking member includes first and second parts with oblong shapes extending in the vertical direction, which are provided alternately in the horizontal direction, and wherein the first part includes a plurality of sub-parts provided in the vertical direction and respective sub-parts includes a plurality of apertures provided at different positions in the vertical and horizontal directions, and the light incident on the second part is shielded.

2. The stereoscopic image display apparatus according to claim 1, wherein, in the respective sub-parts, the apertures are provided stepwise.

3. The stereoscope image display apparatus according to claim 2, wherein the apertures include a first aperture and a second aperture and corners of the first and the second apertures are contact with each other.

4. The stereoscopic image display apparatus according to claim 1, further comprising:

a position detector which detects the position of an observer; and a driving mechanism which drives at least one of the display and the masking member on the basis of the detection results of the position detector.

* * * * *